US006584122B1

(12) United States Patent
Matthews et al.

(10) Patent No.: US 6,584,122 B1
(45) Date of Patent: Jun. 24, 2003

(54) METHOD AND SYSTEM FOR PROVIDING VOICE AND DATA SERVICE

(75) Inventors: John Matthews, North Grafton, MA (US); Antti Kankkunen, Newton, MA (US)

(73) Assignee: Integral Access, Inc., Chelmsford, MA (US)

(*) Notice: Subject to any disclaimer, the term of this patent is extended or adjusted under 35 U.S.C. 154(b) by 0 days.

(21) Appl. No.: 09/460,615

(22) Filed: Dec. 14, 1999

Related U.S. Application Data

(63) Continuation-in-part of application No. 09/266,240, filed on Mar. 10, 1999.
(60) Provisional application No. 60/112,894, filed on Dec. 18, 1998.

(51) Int. Cl.[7] .......................... H04L 12/26; H04L 1/00; H04J 1/16; H04J 3/14; H04M 11/00
(52) U.S. Cl. .................. 370/493; 370/229; 370/412; 370/466; 379/93; 379/98
(58) Field of Search ................ 370/493, 494, 370/465, 466, 467, 468, 252, 286, 271, 229; 379/93.09, 93.34, 93.14, 93.08, 90.01, 399, 398

(56) References Cited

U.S. PATENT DOCUMENTS

| 4,701,907 | A |   | 10/1987 | Collins ........................ 370/63 |
| 4,791,639 | A |   | 12/1988 | Afheldt et al. ................ 370/58 |
| 4,797,589 | A |   | 1/1989  | Collins ........................ 370/63 |
| 4,872,160 | A |   | 10/1989 | Hemmady et al. ............ 370/60 |
| 4,958,341 | A |   | 9/1990  | Hemmady et al. ......... 370/60.1 |
| 5,153,877 | A |   | 10/1992 | Esaki et al. ................ 370/94.1 |
| 5,313,467 | A | * | 5/1994  | Varghese et al. ............ 370/468 |
| 5,463,629 | A |   | 10/1995 | Ko ........................... 370/110.1 |
| 5,583,922 | A |   | 12/1996 | Davis et al. ................... 370/96 |
| 5,602,846 | A | * | 2/1997  | Holmquist et al. .......... 370/384 |
| 5,625,677 | A | * | 4/1997  | Fiertag et al. ................ 379/93 |
| 5,742,606 | A |   | 4/1998  | Iliadis et al. ................. 370/413 |
| 5,751,706 | A |   | 5/1998  | Land et al. .................. 370/352 |
| 5,796,719 | A |   | 8/1998  | Peris et al. .................. 370/231 |
| 5,859,835 | A | * | 1/1999  | Varma et al. ................ 370/229 |
| 5,889,856 | A | * | 3/1999  | O'Toole et al. ............. 370/399 |
| 5,930,340 | A | * | 7/1999  | Bell ........................ 379/93.08 |
| 6,005,873 | A | * | 12/1999 | Amit .......................... 370/494 |
| 6,061,392 | A | * | 5/2000  | Bremer et al. .............. 375/222 |
| 6,101,182 | A |   | 8/2000  | Sistanizadeh et al. ....... 370/352 |
| 6,157,653 | A | * | 12/2000 | Kline et al. .................. 370/412 |
| 6,173,044 | B1 | * | 1/2001 | Hortensius et al. ...... 379/93.09 |
| 6,175,575 | B1 |   | 1/2001  | Ahuja et al. ................ 370/524 |
| 6,222,837 | B1 |   | 4/2001  | Ahuja et al. ................ 370/352 |
| 6,229,818 | B1 | * | 5/2001 | Bell ........................... 370/466 |
| 6,266,348 | B1 | * | 7/2001 | Gross et al. ................. 370/493 |

OTHER PUBLICATIONS

Davie, B. et al., "Use of Tag Switching With ATM" [online], Internet Draft of the Internet Engineering Task Force, Jan. 1997, [retrieved on Oct. 24, 2001]. Retrieved from the Internet:<URL: http://www.watersprings.org/pub/id/draft–davie–tag–switching–atm–01.txt>.

(List continued on next page.)

*Primary Examiner*—Wellington Chin
*Assistant Examiner*—M. Phan
(74) *Attorney, Agent, or Firm*—Testa, Hurwitz & Thibeault, LLP

(57) ABSTRACT

In one embodiment, a method for providing voice and data service includes receiving voice telephone signals and data signals, and transmitting packets in a single protocol link layer over a subscriber line in response to the received telephone signals and the received data signals. The method also includes receiving packets in a single protocol link layer over the subscriber line, and transmitting data signals and voice telephone signals in response to the packets received from the subscriber line. In one embodiment, a network node and a network terminal unit communicate voice telephone signals and data signals by communicating packets in a single protocol link layer over a subscriber line. In another embodiment a first network node communicates voice telephone signals and data signals with a second network node by communicating packets in a single protocol link layer.

41 Claims, 12 Drawing Sheets

OTHER PUBLICATIONS

Doolan, P. et al., "Tag Distribution Protocol" [online], Internet Draft of the Internet Engineering Task Force, May 1997, [retrieved on Oct. 24, 2001]. Retrieved from the Internet:<URL: http//www.watersprings.org/pub/id/draft–doolan–tpd–spec–01.txt>.

Gittlen, S. "IBM to charge for QoS patents" [online], Network World, Nov. 9, 1998, [retrieved on Nov. 16, 1998]. Retrieved from the Internet:<URL: http://www.nwfusion.com/news/1109mpls.html>.

Hatala, T. et al., "Voice over Frame Relay Implementation Agreement FRF.11," Frame Relay Forum Technical Committee, Freemont, CA, May 1997.

Ohba, Y. et al., "Comparison of Tag Switching and Cell Switch Router" [online], Internet Draft of the Internet Engineering Task Force, Apr. 1997, [retrieved on Oct. 24, 2001]. Retrieved from the Internet:<URL: http://www.watersprings. org/pub/id/draft–ohba–tagsw–vs–csr–00.txt>.

Rekhter, Y. et al., "Cisco Systems Tag Switching Architecture Overview" [online], Internet Draft of the Internet Engineering Task Force, Feb. 1997, [retrieved on Mar. 19, 1998]. Retrieved from the Internet:<URL: http://ds.internic.net/rfc/rfc2105.txt>.

Rekhter, Y. et al., "Tag Switching Architecture—Overview" [online], Internet Draft of the Internet Engineering Task Force, Jul. 1997, [retrieved on Mar. 19, 1998]. Retrieved from the Internet:<URL: http://ds.internic.net/internet–dr . . . raft–rekhter–tagswitch–arch–01.txt>.

Rosen, E.C. et al., "Label Switching: Label Stack Encodings" [online], Internet Draft of the Internet Engineering Task Force, Jul. 1997, [retrieved on Oct. 23, 2001]. Retrieved from the Internet:<URL: http://www.watersprings.org/pub/id/draft–rosen–tag–stack–03.txt>.

Sinicrope, D.A. "The Frame Relay Form User–to–Network Implementation Agreement (UNI) FRF 1.1," Frame Relay Forum Technical Committee, Freemont, CA, Jan. 19, 1996.

"Cisco Takes On Traffic, Growth Concerns " [online], CNET NEWS.COM, Sep. 13, 1996, [retrieved on Mar. 19, 1998]. Retrieved from the Internet:<URL: http://www.news.com/News/Item/0,4,3439,00.html>.

"Empowering the Era of the Internet and Intranets" [online], Cisco Systems, [retrieved on Mar. 12, 1998]. Retrieved from the Internet:<URL: http://www.cisco.com/warp/public/732/tag/index.html>.

"ITU–T Recommendation G.902," International Telecommunication Union, Geneva, Switzerland, 1995.

"Scaling the Internet With Tag Switching" [online], Cisco Systems [retrieved on Mar. 19, 1998]. Retrieved from the Internet:<URL: http://www.cisco.com/warp/public/732/tag/tagsw_wp.htm>.

\* cited by examiner

INTERMEDIATE HEADER

SWITCH PACKET FORMAT

HUB FUNCTION MODULE
OVERVIEW

NTU**

NETWORK NODE DATA FLOW

METHOD AND SYSTEM FOR PROVIDING VOICE AND DATA SERVICE

PRIORITY TO EARLIER-FILED APPLICATIONS

This application claims priority to U.S. Provisional Patent Application Ser. No. 60/112,894, filed Dec. 18, 1998, and is a continuation-in-part of U.S. patent application Ser. No. 09/266,240, filed Mar. 10, 1999, both of which are incorporated herein by reference.

TECHNICAL FIELD

This invention relates to communications equipment and, more particularly, to a method and system for providing voice and data service.

BACKGROUND INFORMATION

In a communications network, signals using various telecommunications and data protocols typically are communicated from a source over a transmission line to a node. The node forwards those signals to a destination, often over another transmission line. Some nodes receive data packets from various sources, or convert source signals to data packets, and forward the data packets to various destinations. Various packet transmission and time division multiplexing ("TDM") transmission protocols are known, and include, but are not limited to, ATM, ethernet, frame relay, GR-303, HDLC, MPLS, V5.x, and xDSL protocols.

xDSL is a communications technology that allows high speed data communication over a copper wire pair, or loop. One application of xDSL is communicating hundreds of thousands of bits per second of data over the existing copper telephone wire pairs that are already in place between telephone offices and subscribers, sometimes referred to as subscriber loops. xDSL is a technology that allows a service provider to make use of the already existing telephone subscriber loops to provide new services.

One type of system that provides xDSL data service is referred to as a Digital Subscriber Line Access Multiplexer, or DSLAM. A DSLAM is used to interface subscriber xDSL connections to a computer network. Generally, such DSLAM systems share the copper wire loop with a separate telephone switch or digital loop carrier. The telephone switch provides telephone service and the DSLAM provides high-speed data service. Generally, a DSLAM and telephone switch share a subscriber's copper wire loop by dividing the frequency band available to the copper wire loop. The telephone switch communicates with the subscriber telephone equipment in the baseband, as is traditional for such telephone equipment, and the xDSL/DSLAM equipment operates in the frequencies above the voice-band, for example above 20 kHz. Having two separate types of equipment, a DSLAM and a telephone switch, is costly and inefficient, at least in part because it requires maintenance of two types of equipment.

SUMMARY OF THE INVENTION

The invention relates to a method and system for providing voice and data service, in which voice signals and data signals are communicated over the same protocol link layer. In one embodiment, a network node and associated network terminal unit provide voice and data service by communicating voice telephone signals and data signals over a subscriber line by communicating packets associated with the voice telephone signals and packets associated with the data signals over the same protocol link layer. The network node communicates the subscriber data packets with a data network and subscriber voice packets with a telephone network.

In one aspect, the invention relates to a method for providing voice and data service. The method includes receiving voice telephone signals, receiving data signals, and transmitting packets in a single protocol link layer over a subscriber line in response to the received telephone signals and the received data signals. The method also includes receiving packets in a single protocol link layer over the subscriber line, transmitting data signals in response to the packets received from the subscriber line, and transmitting voice telephone signals in response to the packets received from the subscriber line.

In one embodiment, the steps of the method are performed simultaneously. In another embodiment, the packets are transmitted in a single protocol link layer over a subscriber loop in response to the received telephone signals and the received data signals, and packets are received in a single protocol link layer over the subscriber loop. In another embodiment, packets are transmitted in a single protocol link layer over a subscriber loop using xDSL protocol in response to the received telephone signals and the received data signals, and packets are received in a single protocol link layer over the subscriber loop using xDSL protocol. In another embodiment, connection protocol packets are transmitted in a single protocol link layer over a subscriber loop using xDSL protocol in response to the received telephone signals and the received data signals, and connection protocol packets are received in a single protocol link layer over the subscriber loop using xDSL protocol. In another embodiment, connection protocol packets are transmitted in a single protocol link layer over a subscriber loop using xDSL protocol to a network node in response to the received telephone signals and the received data signals, and connection protocol packets are received in a single protocol link layer over the subscriber loop using xDSL protocol from a network node.

In yet another embodiment, the voice telephone signals and data signals are communicated with different connections. In another embodiment, voice telephone signals are transmitted and received to and from a telephone connection, and data signals are transmitted and received to and from a data connection. In another embodiment, voice telephone signals are transmitted and received to and from a telephone trunk, and data signals are transmitted and received to and from a data network.

In another aspect, the invention relates to a method for providing voice and data service that includes the steps of communicating voice telephone signals and data signals with a first network node, and communicating connection protocol packets in a single protocol link layer between the first network node and a second network node in response to the voice telephone signals and the data signals. In one embodiment, the voice telephone signals are communicated between a telephone network and the first network node, and the data signals are communicated between a data network and the first network node.

In another aspect, the invention relates to a subscriber line connected to a network node and a subscriber device. The subscriber line carries a xDSL signal. The xDSL signal carries connection protocol packets. The connection protocol packets carry voice telephone signals and data signals. The voice telephone signals and data signals are communicated on the same protocol link layer over the subscriber line.

In another aspect, the invention relates to a network terminal unit. The network terminal unit includes a telephone interface in communication with a telephone connection and a data interface in communication with a data connection. The network terminal interface includes a transceiver in communication with the telephone interface, the data interface, and a subscriber line connection. The transceiver communicates packets in a single protocol link layer over the subscriber line connection in response to telephone signals received by the telephone interface and data signals received by the data interface.

In one embodiment, the data interface includes an ethernet protocol interface. In another embodiment, the telephone interface includes a POTS interface. In another embodiment, the transceiver includes an interworking function for receiving packets from the telephone interface and the data interface and converting the packets into connection protocol packets, a connection protocol switch for identifying the destination of the connection protocol packets, and a switch interface for transmitting the connection protocol packets over the subscriber line connection. In another embodiment, the transceiver receives connection protocol packets in a single protocol link layer from the subscriber loop connection, and communicates voice telephone signals to the telephone interface and data signals to the data interface in response to the connection protocol packets. In another embodiment, the transceiver includes a connection protocol switch for identifying the destination of the connection protocol packets, and an interworking function for converting the connection protocol packets into data appropriate for the voice interface and the data interface.

In another aspect, the invention relates to a network node that includes at least one function module. The function module includes a protocol interface for receiving signals and converting the signals into intermediate packets, and for transmitting signals in response to intermediate packets. The function modules also includes an interworking function for receiving the intermediate packets from the protocol interface and converting the packets into connection protocol format, and for converting connection protocol packets into intermediate packets and providing the intermediate packets to the protocol interface. The function module also includes a connection protocol switch for identifying the destination of the connection protocol packets, and a switch interface for communicating connection protocol packets with a backplane switch.

In another aspect, the invention relates to a system for providing voice and data service. The system includes a network node that includes at least one function module. The function module includes a protocol interface for receiving signals and converting the signals into intermediate packets, and for transmitting signals in response to intermediate packets. The function module also includes an interworking function for receiving the intermediate packets from the protocol interface and converting the packets into connection protocol format. The function module also includes converting connection protocol packets into intermediate packets and providing the intermediate packets to the protocol interface. The function module also includes a connection protocol switch for identifying the destination of the connection protocol packets, and a switch interface for communicating connection protocol packets with a backplane switch. The system also includes a subscriber line in electrical communication with the protocol interface on the network node function module. The system also includes a network terminal unit. The network terminal unit includes a subscriber line interface in communication with the subscriber line for communicating connection protocol packets in a single protocol link layer over the subscriber line with the network node.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
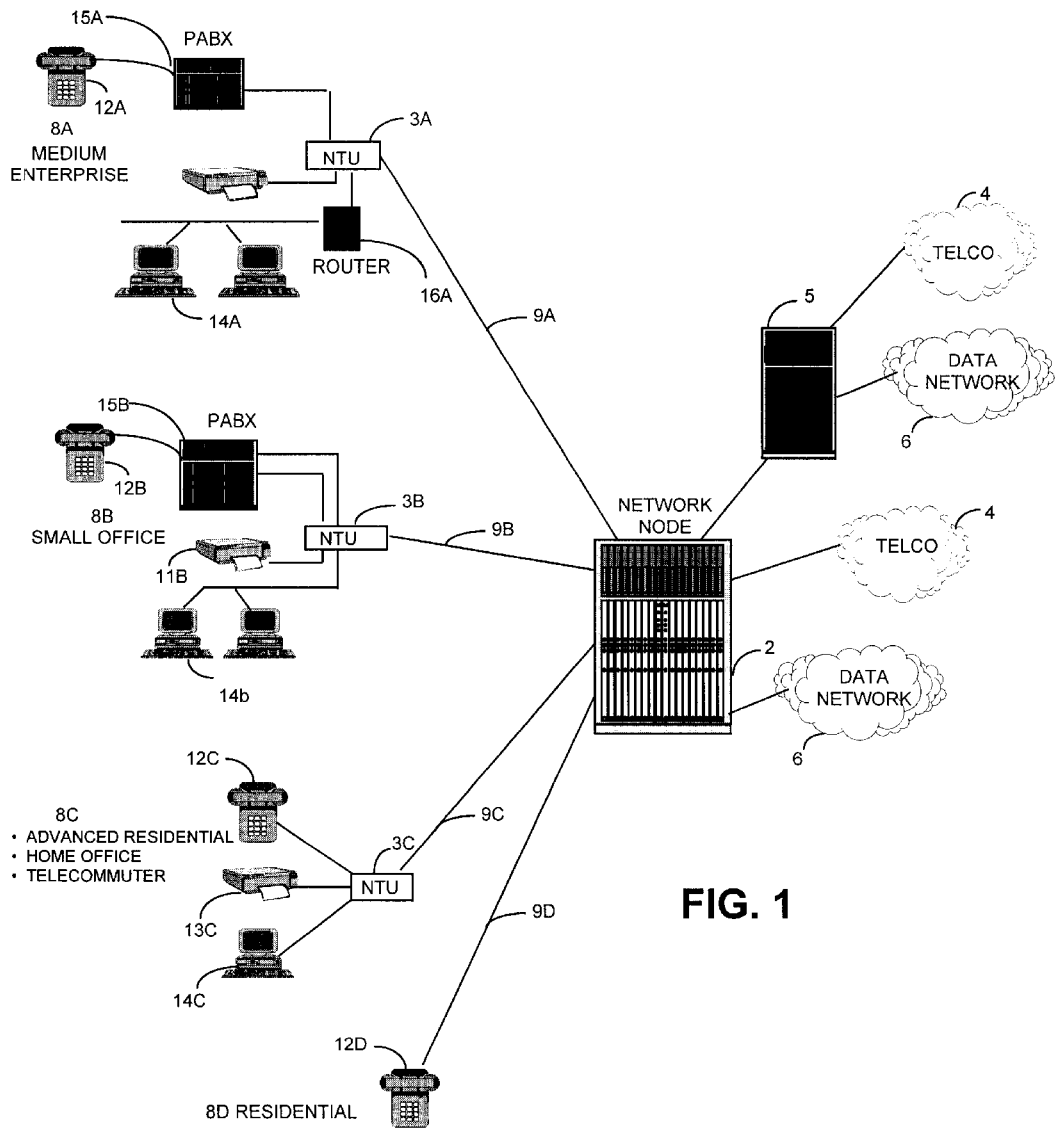
FIG. 1 is a block diagram of an embodiment of a system according to the invention.

Referring to FIG. 1, an embodiment of a network node 2 provides voice telephone service by communicating between subscribers 8A, 8B, 8C, 8D, generally 8, and one or more telephone networks 4. The network node 2 provides data services by communicating between the subscribers 8 and one or more data networks 6. The number of subscribers 8, telephone networks 4, and data networks 6 is illustrative, and is not intended to limit the invention. There can be various numbers and types of subscribers, telephone networks, and data networks connected to the network node 2.

As shown in FIG. 1, an example subscriber 8A is a medium-sized office, having a Private Automatic Branch Exchange (PABX) 15A that is a telephone exchange connected to telephone equipment 12A. The subscriber 8A also has one or more computer networks 14A, which are connected to a data router 16A such as an Internet Protocol router. Both the PABX 15A and the router 16A are connected to a Network Terminal Unit ("NTU") 3A. The NTU 3A is equipment located at the subscriber premises that is in communication with the network node 2, and that interfaces between the network node 2 and the subscriber's voice 15A and data equipment 16A. In other words, the network node 2 communicates with the subscriber's telephone equipment 12A and data equipment 14A through the NTU 3A.

Another example subscriber 8B is a small office that has a PABX 15B but no data router. The subscriber's PABX 15B is connected to the telephone interface of the NTU 3B, as is the subscriber's fax machine 11B. Several computers on a computer network 14B are connected to the data interface of the NTU 3B.

Another example subscriber 8C is a residential or home office subscriber. This subscriber 8C has a telephone 12C and a fax 13C that connect to the telephone interface of the NTU 3C using a Plain Old Telephone Service ("POTS") interface. The subscriber 8C also has a computer, which connects to the NTU 3C via a data interface.

Another subscriber 8D has a telephone 12D, which connects directly to the network node 2 using a POTS interface connection. Such a subscriber may not have access to high-speed data services. The subscriber 8D is included in the example to show that, in one embodiment, the network node is capable of providing POTS service without use of a NTU 3.

The NTUs 3A, 3B, 3C, generally 3, and telephone 12D are connected to the network node 2 via subscriber lines 9A, 9B, 9C, 9D, generally 9. In one embodiment, the subscriber line 9 is a subscriber loop, such as a copper twisted pair commonly used for telephone service. In other embodiments, the subscriber lines 9 are multiple twisted pairs, optical fiber, or coaxial cable. It is even possible for the subscriber line 9 to be a wireless connection between the subscriber 8 and the network node 2.

In one embodiment, in which the subscriber line 9 is a twisted pair subscriber loop, the NTUs 3 communicate with the network node 2 using Digital Subscriber Line ("xDSL") technology. In other embodiments, the NTU 3 and the network node 2 communicate using ISDN or Frame Relay technology. The NTU 3 and network node 2 communicate voice and data products together in the same protocol link layer.

In one embodiment, the telephone network 4 is the public switched telephone network. In one embodiment, the data network 6 is the Internet. The networks shown are intended to be examples, and not to limit the invention to any particular voice or data network connection. By design, the system is quite flexible, and can interface with many voice and data networks of various types and using various protocols.

In one embodiment, the network node 2 connects to the telephone network 4 and the data network 6 through a second network node 5. In one embodiment, the second network node 5 is logically part of the network node, but is located proximate to the telephone network 4 and/or the data network 6. In other embodiments, the network node 2 connects directly to the telephone network 4 and the data network 6. Still other embodiments include more than one other network nodes 5.

Figure 2:
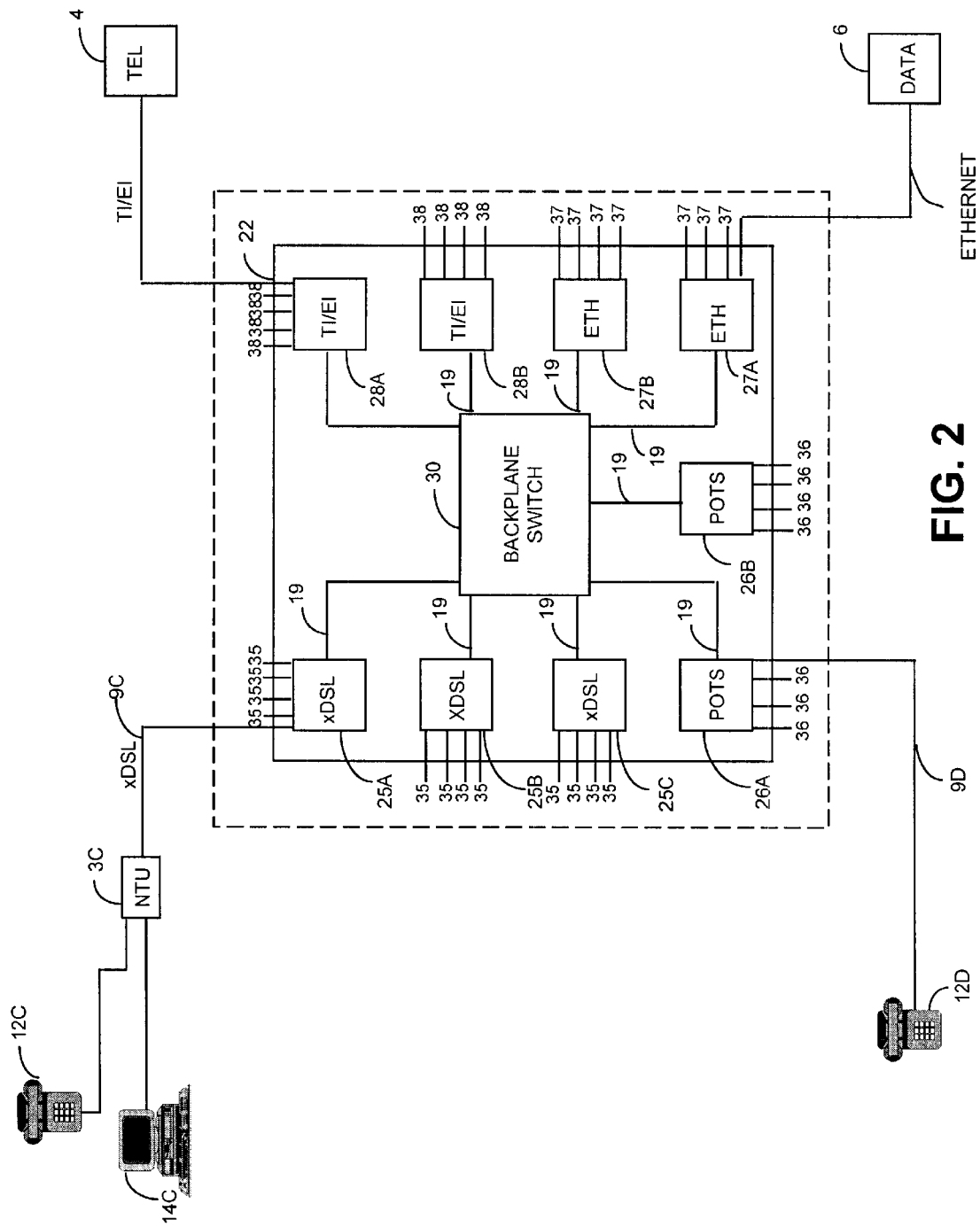
FIG. 2 is a block diagram illustrating the architecture of an embodiment of a network node.

Referring to FIG. 2, an embodiment of the network node 2 includes a backplane switch 30, and various function modules, generally numbered 25–28. The function modules 25–28 each provide an interface for the communications protocols communicated by the network node 2. As shown in the figure, the network node 2 includes Digital Subscriber Line ("xDSL") function modules 25A, 25B, 25C; POTS function modules 26A, 26B; ethernet function modules 27A, 27B; and T1/E1 function modules 28A, 28B. The function modules shown in the figure are exemplary. It should be clear from the following description that, in various embodiments, the number and type of function modules can include any number of various interfaces and communications protocols. A single function module may include interface functionality for more than one communications protocol. A function module can also include other functionality, for example the backplane switch 30, and node management functionality.

A function module 25–28 receives and transmits signals from outside the node that are communicated with the node in a protocol format associated with that function module. Each function module 25–28 has ports 35–38 that provide an interface to the signals in a protocol format associated with that function module. For example, the xDSL function module 25A includes xDSL ports 35, the POTS function module 26A includes POTS ports 36, ethernet function module 27 includes ethernet ports 37, and T1/E1 function module 28 includes T1/E1 ports 38.

A function module that receives signals from outside the node is referred to as an ingress function module. The ingress functionality of a function module 25–28 converts the signals received from outside the node via the ports 35–38 into connection protocol data packets. The egress functionality of a function module 25–28 converts connection protocol data packets into signals and communicates them out the ports 35–38. The packets are communicated from the ingress function module to an egress function module via a backplane switch 30. The egress function module communicates with equipment outside the network node 2 using the same or a different protocol as the ingress function module. Generally, a function module is both an ingress function module and an egress function module, since each function module provides two-way (bidirectional) communication.

As an example, to explain the flow of signals through the node 2, in the embodiment shown in FIG. 2, a POTS function module 26A communicates with a POTS subscriber 12D. The POTS subscriber 12D is connected via a subscriber line 9D to a port 36 on the POTS function module 26A. The POTS function module 26A receives telephone signals from the POTS subscriber 12D, and converts the signals into data packets. The backplane switch 30 communicates the packets from the POTS function module 26A to, in this example, a T1/E1 function module 28A. The T1/E1 function module is connected to the telephone network connection to a T1/E1 port 38 on the function module. The T1/E1 function module communicates with the telephone network 4 equipment using a particular telephone protocol, for example GR-303 and, for example, T1 or E1 data transmission protocol. The T1/E1 function module 28A converts packets representing the signals from the POTS subscriber 12D into the appropriate format and communicates them to the telephone network 4. In this direction, from subscriber 12D to telephone network 4 equipment, the POTS function module is an ingress for the telephone signals from the subscriber 12D, and the T1/E1 interface is an egress for those signals to the telephone network 4.

In the other direction, from telephone network 4 equipment to subscriber 12D, the T1/E1 function module 28A is an ingress into the network node 2 when it receives signals from the telephone network 4 equipment. Those signals, which are in telephone equipment format (e.g. GR-303), are converted by the T1/E1 function module 28A into connection protocol data packets that are suitable for communication to the POTS function module 26A. The backplane switch 30 communicates the connection protocol data packets from the T1/E1 function module 28A to the POTS function module 26A, which in turn converts the data packets into telephone signals appropriate for communication over the telephone line to the subscriber telephone equipment 12D.

As shown in FIG. 2, a NTU 3C, in coordination with a xDSL function module 25A in the node 2, acts as both an ingress point into and an egress point out of the network node 2. The NTU 3C receives telephone signals from subscriber telephone equipment 12C and data signals from subscriber data communications equipment 14C. The NTU 3C converts the telephone and data signals into connection protocol data packets appropriate for communication to an egress interface. The NTU 3C communicates the connection protocol data packets over the subscriber line 9C to the xDSL function module 25A in the network node 2, which in turn communicates the data packets to an egress interface via the backplane switch 30. For example, connection protocol data packets containing the data from the subscriber data equipment 14C are communicated to an ethernet function module 27A for communication to an internet service provider 6. Connection protocol data packets containing the signals from the subscriber telephone equipment 12C are communicated by the xDSL function module 25A to a T1/E1 function module 28A that is an egress point to the telephone trunk equipment 4. Similarly, signals coming into the network node 2 at the T1/E1 function module 28A and the ethernet function module 27A are communicated as connection protocol data packets, via the backplane switch 30, to the xDSL interface 25A, which communicates the connection protocol data packets on to the NTU 3C. The NTU 3C converts the connection protocol data packets into signals appropriate for the subscriber telephone equipment 12C and subscriber data equipment 14C. The NTU 3C thus acts as an ingress into and egress from the network node.

Figure 3:
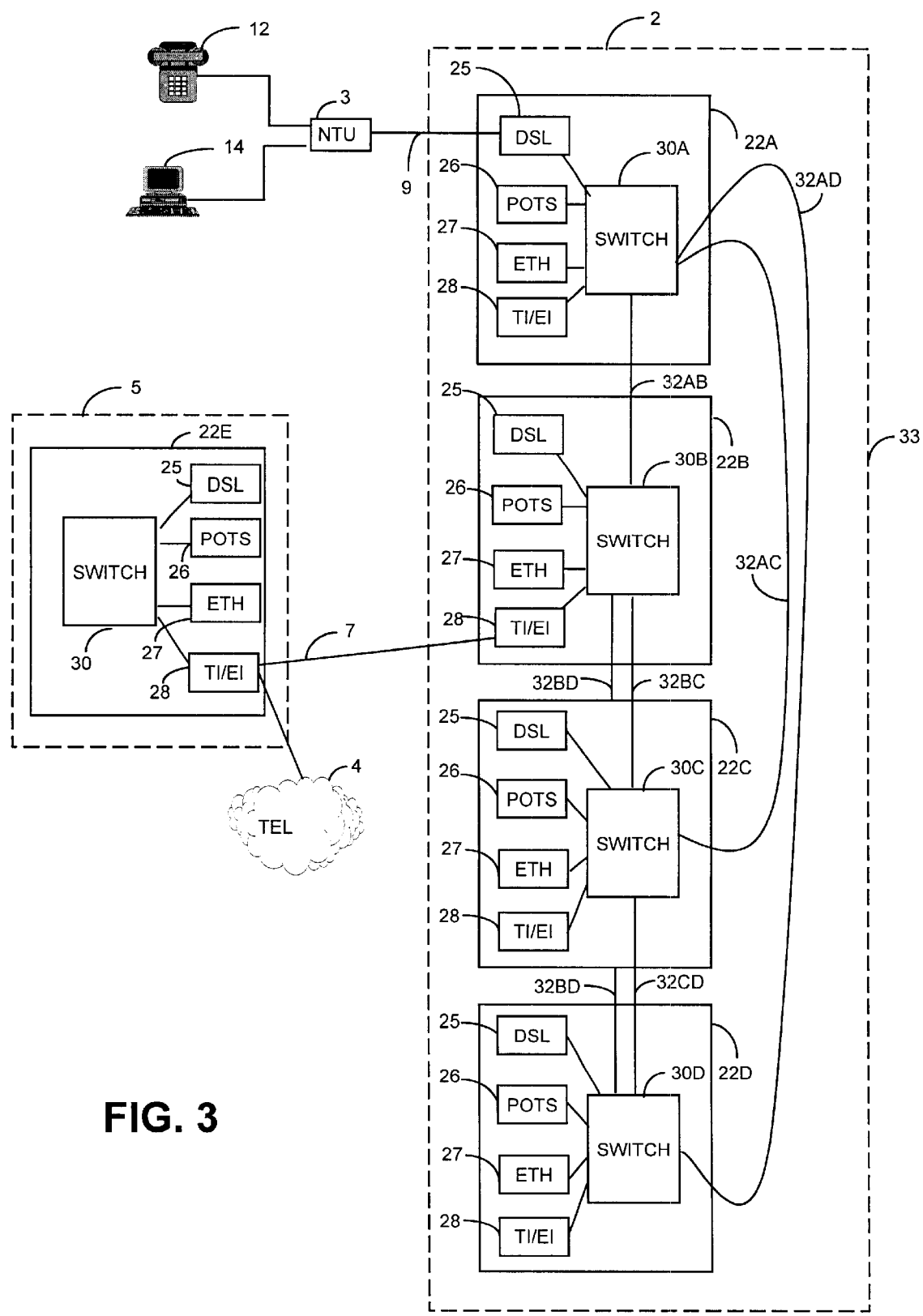
FIG. 3 is a block diagram illustrating a multi-backplane embodiment of the network node.

Referring to FIG. 3, in one embodiment, the function modules 25–28 in network nodes 2, 5 are each associated with a backplane 22A, 22B, 22C, 22D, 22E, generally 22. One embodiment of a network node 2 includes four backplanes 22A, 22B, 22C, 22D. Each backplane includes one or more function modules 25–28. Four exemplary function modules 25–28 are shown in the figure associated with a backplane 22, as examples of various function modules. A backplane may have many or none of a particular function module. Four of the function modules are not shown. Each backplane 22 has a backplane switch 30, which communicates packets between the function modules 25–28, and also communicates packets with the other backplane switches 30 in the node 2. In one embodiment, the backplane switch 30 is implemented on a function module connected to the backplane, referred to as a hub function module (HFM).

In one embodiment, each backplane switch 30 has a connection, generally 32, to one or more other backplane switches 30 within the node. These connections 32 between backplane switches are shown in the figure. There is a first connection 32AB between the first backplane 22A from the top and the second backplane 22B, a second connection 32AC between the first backplane 22A and the third backplane 22C, and a third connection 32AD between the first backplane 22A and the fourth backplane 22D. There is a fifth connection 32BC between the second backplane 22B and the third backplane 22C, and a sixth connection 32BD between the second backplane 22B and the fourth backplane 22D. There is a seventh connection 32CD between the third backplane 22C and the fourth backplane 22D. These backplane switches 22A, 22B, 22C, and 22D exchange packets over the connections 32. A function module in one backplane (for example backplane 22B) communicates with function modules on other backplanes (for example backplanes 22A, 22C and 22D) via the connections between the backplane switches. The function modules communicate with function modules on different backplanes using the same connection packet format as is used to communicate from one function module to another on the same backplane 22. Thus, one backplane within the network node 2 can be the ingress point for signals, and another backplane can be the egress point.

In the embodiment shown in FIG. 3, a second network node 5 is in communication with the first network node 2. The first network node 2 and second network node 5 communicate using the same connection packet format as is used to communicate from one function modules to another within a single backplane. In this embodiment, a function module 25 on one backplane 22A of a first network node 2 can be the ingress point of telephone and data signals into the network node system, and a function module 28 of a backplane 22E of a second network node 5 can be the egress point of the system, and vice-versa. A group of network nodes 2, 5 that communicate using the same connection packet format as is used to communicate from one function module to another on the same backplane is referred to as a network node domain. In one embodiment, the connection 7 from one network node 2 to another network node 5 within the same domain is implemented by encapsulating connection protocol packets in another communication protocol, such as ethernet or multilink point-to-point protocol ("MLPPP").

Figure 4:
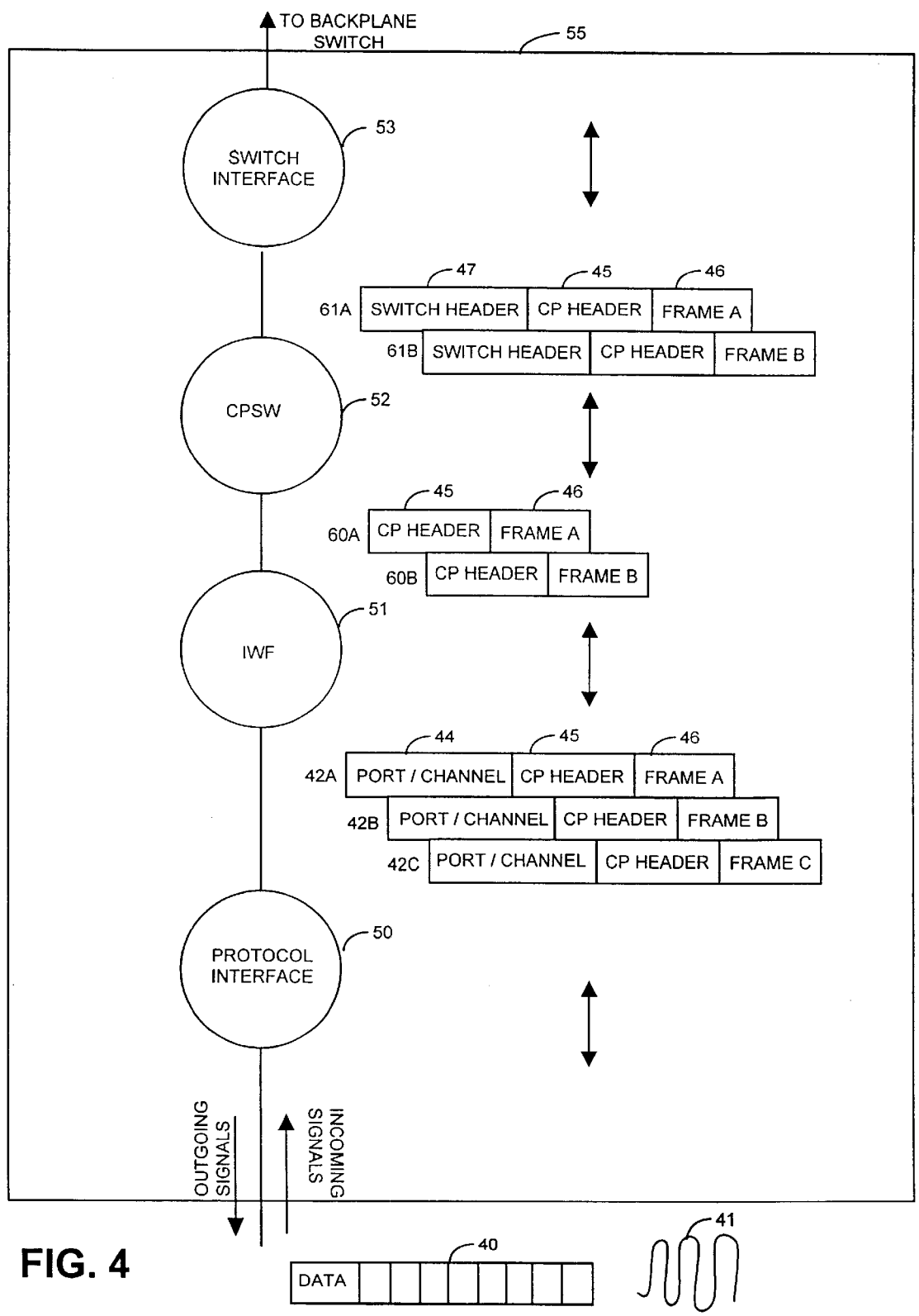
FIG. 4 is a block diagram illustrating the functional architecture of an embodiment of a function module.

Referring to FIG. 4, a general model of an embodiment of a function module 55 shows how each function module communicates signals using one or more communication protocols. The function module model 55 is not specific to any particular type of interface or interface protocol. This model is intended to be a general overview showing signal flow through the various embodiments of function modules.

The function module model 55 includes a protocol interface 50, which includes hardware interface components specific to the interface protocol. Signals received by the protocol interface 50 are transformed into packets, which are passed on to an interworking function ("IWF") 51. The interworking function 51 introduces the packets into system and assigns a connection identifier to each packet. The interworking function 51 passes the packets on to a connection protocol software switch CPSW 52, which then, through a backplane switch interface 53, exchanges packets with a backplane switch, for transfer of the packets to another function module (on the same or different backplane) or to another network node 2. In the other direction, signals from the backplane switch come into the connection protocol software switch 52, through the switch interface 53. The connection protocol software switch verifies the packet, and passes it on to the IWF 51. The IWF 51 determines the appropriate output port and/or channel for the packet and passes it on to the protocol interface 50. The protocol interface reconstructs a packet or signal from a number of frames (if necessary), and outputs the signal in the appropriate format.

The protocol interface 50 transmits and receives signals formatted in a particular communications protocol. Generally, the protocol interface 50 can include both hardware and software components. As an example, a POTS physical interface includes analog-to-digital converters to receive the analog POTS signals (for signal ingress into the network node 2), and digital-to-analog converters to transmit analog POTS signals as an egress. The POTS physical interface also includes compression and other signal-level processing functionality that can be implemented by software running on a digital signal processor. The POTS protocol physical interface can also include signaling capability (ringing, on-hook/off-hook detection, etc.).

As another example, an Ethernet protocol physical interface 50 includes ethernet hardware to receive and transmit ethernet frames, as well as driver software to operate the ethernet hardware. Other protocol interfaces 50 similarly include software and/or hardware to transform incoming signals into packets, and to transform outgoing packets into the appropriate signals.

Each protocol interface 50 converts incoming signals into packets of a specified format. In one embodiment, packets have a maximum length of 256 bytes. Data frames communicated to the network node 2 using protocols that allow frames longer than a packet are broken up into several packets, which in this context are the smaller packets generated from the frame. FIG. 4 shows a data frame broken up into three packets 42A, 42B, and 42C, generally 42. The protocol interface 50 assigns packets communicated to the IWF 51 an intermediate header 44 that indicates the source port and channel of the signals data. The port and channel information varies depending on the type of function module. For example, in a POTS function module with thirty-two POTS ports, each port has its own port identifier and the channel refers to whether the packet is voice data, or call signaling (call control) data. As another example, in a T1/E1 function module, the port identifies one of the eight T1/E1 interfaces, and the channel refers to one of the TDM channels associated with that interface. The intermediate header 44 is followed by a connection protocol header 45. Only some information in the connection protocol header 45 is filled in by the protocol interface 50, such as the number of packets associated with an incoming signal or frame, the packet number of the frame, and the length of the packet.

The IWF 51 receives the intermediate packets 42, and converts them into connection protocol format packets 60 by removing the intermediate header 44, and completing the connection protocol header information 45. The IWF 51 reads the source port/channel information 44 that is appended to the front of the packet, and determines the appropriate connection for that packet. For example, if the IWF 51 determines that data is from a port/channel that is associated with a particular telephone trunk connection, the appropriate connection identifier for that telephone trunk connection is filled in the connection protocol header. Likewise, if the port/channel identifier 44 is associated with a particular data network connection, that connection identifier is filled in to the connection protocol header. In one embodiment, the association of port/channel interfaces with connection identifiers is provisioned, so that connections are set up by a system operator or node network management system. In other embodiments, the connections are dynamically set up when needed. The IWF 51 also fills in the application specific identifier, quality of service identifier, and any other necessary information in the connection protocol header. Having filled in the connection protocol header 45, the IWF 51 passes the connection protocol packets 60 on to the connection protocol software switch 52.

The connection protocol switch ("CPSW") 52 prepares the connection protocol packet 60 for communication to another function module by the backplane switch. The connection protocol switch 52 reads the connection header 45 and determines which function module on the same or different backplane within the network node 2 is the appropriate destination for the packet. If the destination is a function module on a different backplane, the backplane switch will communicate the packet to the other backplane switch, which will in turn communicate the packet to the destination function module. If the destination is another node within the network node domain, the packet will be communicated to that other node via a function module (possibly the hub function module) and that function module is the packet destination from the point of view of the backplane switch.

The connection protocol switch 52 appends a switch header 47 to the front of the packet. The switch header 47 identifies the destination backplane and function module within the network node to which the packet should be transmitted by the backplane switch 30. The connection protocol switch 52 maintains a mapping of connection identifiers to destination function modules. The connection protocol switch 52 queues the packet for transmission to the backplane switch 30. The backplane switch 30 will, based on the switch header 47, transmit the packet to the appropriate function module.

In the other direction, that is for packets received from the backplane switch 30, the switch interface 53 receives switch protocol packets 61. The switch interface 53 verifies that, according to the checksum, the packets are transmitted correctly, and passes the packets on to the connection protocol switch 52. The switch packets 61 have a switch header 47, a connection protocol header 45, and data 46. The connection protocol switch 52 reads the switch header, and verifies that the packet was intended for that function module. The connection protocol switch 52 then passes the packet on to the IWF 51. The IWF 51 determines, from the connection identifier, the appropriate destination port and channel for the packet data. The IWF 51 appends the destination port/channel 44 onto the front of the packet 42. The IWF 51 passes the packet 42 onto the protocol interface 50 for conversion into the appropriate signals according to that protocol. The physical interface for a data protocol function module, for example, accumulates all the packets which are part of a single frame, recombines the data into one frame, and transmits the data out the appropriate port. The physical interface for a POTS function module converts the data in the packet into analog telephone signals. The function module transmits the signals out the appropriate port indicated in the header 44.

Figure 5:
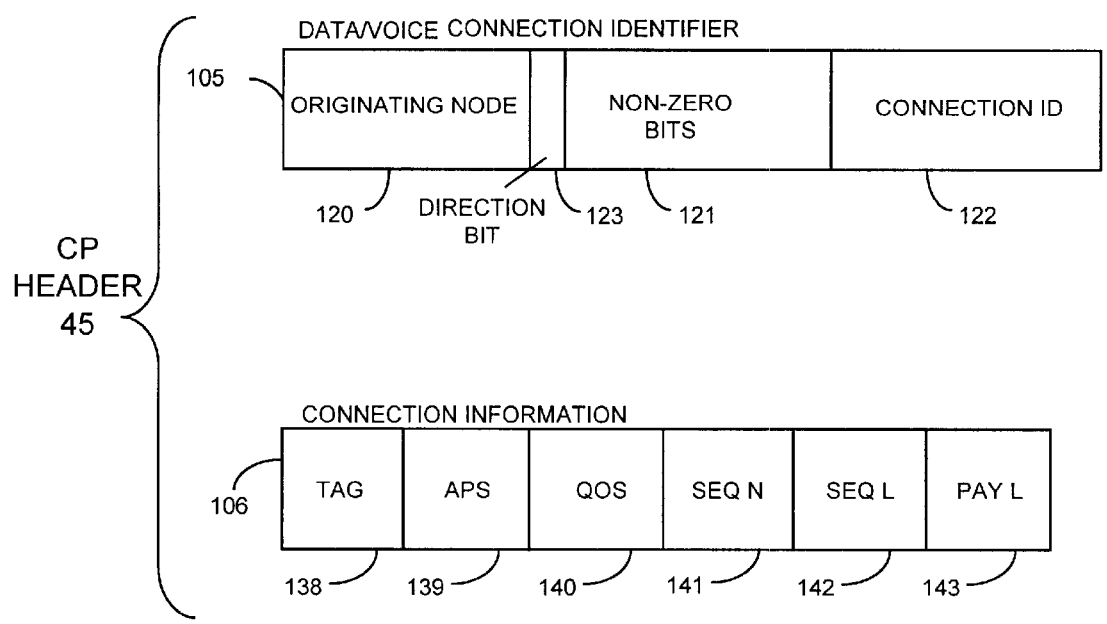
FIG. 5 is a block diagram of an embodiment of a connection protocol header.

Referring to FIG. 5, a connection protocol packet 60 includes a connection protocol header 45 that is used for communication of packets throughout the domain of network nodes. Each connection between an ingress and egress point, as well as internal connections within the system, has a connection identifier. The connection identifier is unique for each pair of ingress/egress points, where each ingress/egress point is uniquely identified by its network node, backplane, slot, port, and channel. The interworking functions within the function modules assign the connection identifiers to packets based on their source and destination. The connection protocol switches 52 in the function modules use the connection identifiers to forward data packets to the appropriate parts of the network node 2 and the network node 2 domain. A connection protocol switch in each function module determines, based on the connection header, where a packet should be forwarded.

The connection protocol header 45 includes a connection identifier 105. For voice and data information, the data/voice connection identifier 105 includes bits 120 that identify the originating network node 2 of the connection, non-zero information 121, a connection identifier 122, and a direction identifier 123. Connection identifiers are unique, and are assigned by the originating node of a connection. Since each of a number of nodes can assign connection identifiers, and it is important that the connection identifiers be unique, the connection identifiers include the network node identifier 120. The network node 2 assigning the connection identifier 122 to a connection can insure that the connection identifiers that include that node identifier are unique. Thus, each network node 2 can assign connection identifiers 122, and all the identifiers are unique. The direction identifier 123 is determined by the originating node. In one embodiment, the direction identifier bit 123 is set for traffic from the originating node and in another embodiment, the direction identifier bit 123 is set for traffic destined to the originating node. Thus, the connection identifier describing a connection between a subscriber and a trunk includes one connection identifier, with (for example) the direction bit set for packets going from the subscriber to the trunk, and with the direction bit cleared for packets going from the trunk to the subscriber.

In addition to the connection identifier 105, each packet includes thirty-two bits of other connection information 106. This connection information 106 includes a tag 138 (used to identify a group of packets), application-specific information 139 (APS), a quality of service (QOS) identifier 140 (for indicating the priority of the packet), a sequence number 141 (for identifying a frame in a sequence of frames), a sequence length 142 (for identifying the total number of frames), and the payload length 143.

Figure 6:
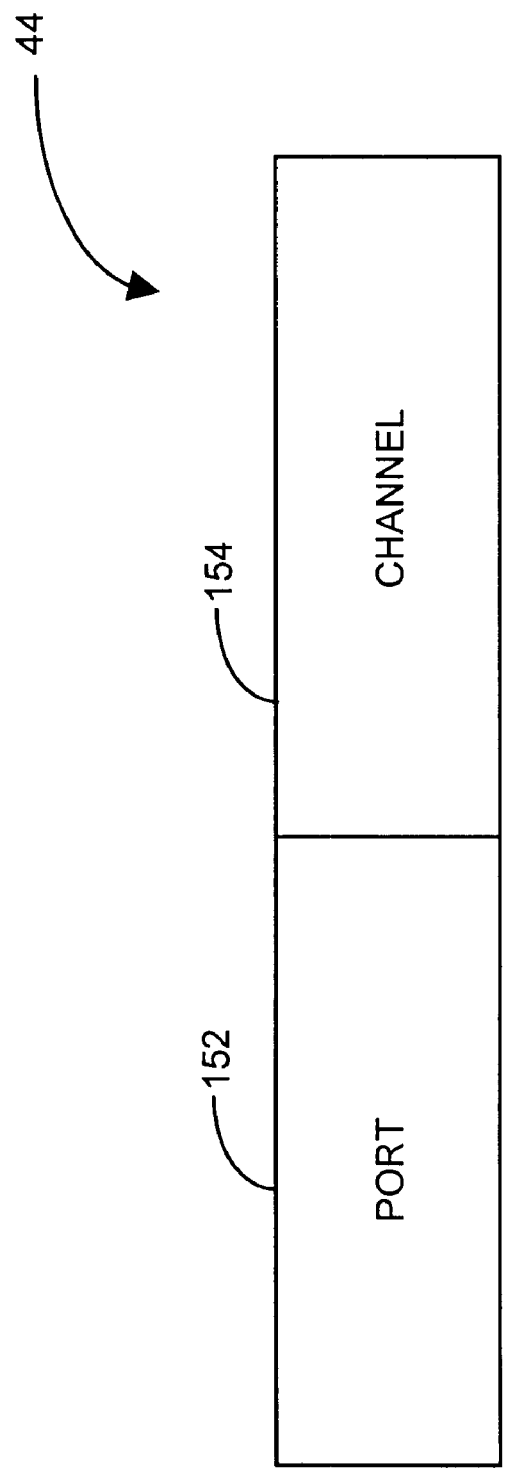
FIG. 6 is a block diagram of an embodiment of an intermediate header.

Referring to FIG. 6, an intermediate packet header 44 is used to identify the source and/or destination port and channel (or task) associated with a packet. In one embodiment, an intermediate packet header 44 is appended to the front of data packets communicated between a protocol interface and interworking function within a function module. In one embodiment, the intermediate packet header 44 includes a port identifier 152 and a channel identifier 154. The port identifier 152 identifies which port within a function module the packet is associated with. The channel identifier 154 indicates which communications channel (or task) of that port the packet is associated with.

Figure 7:
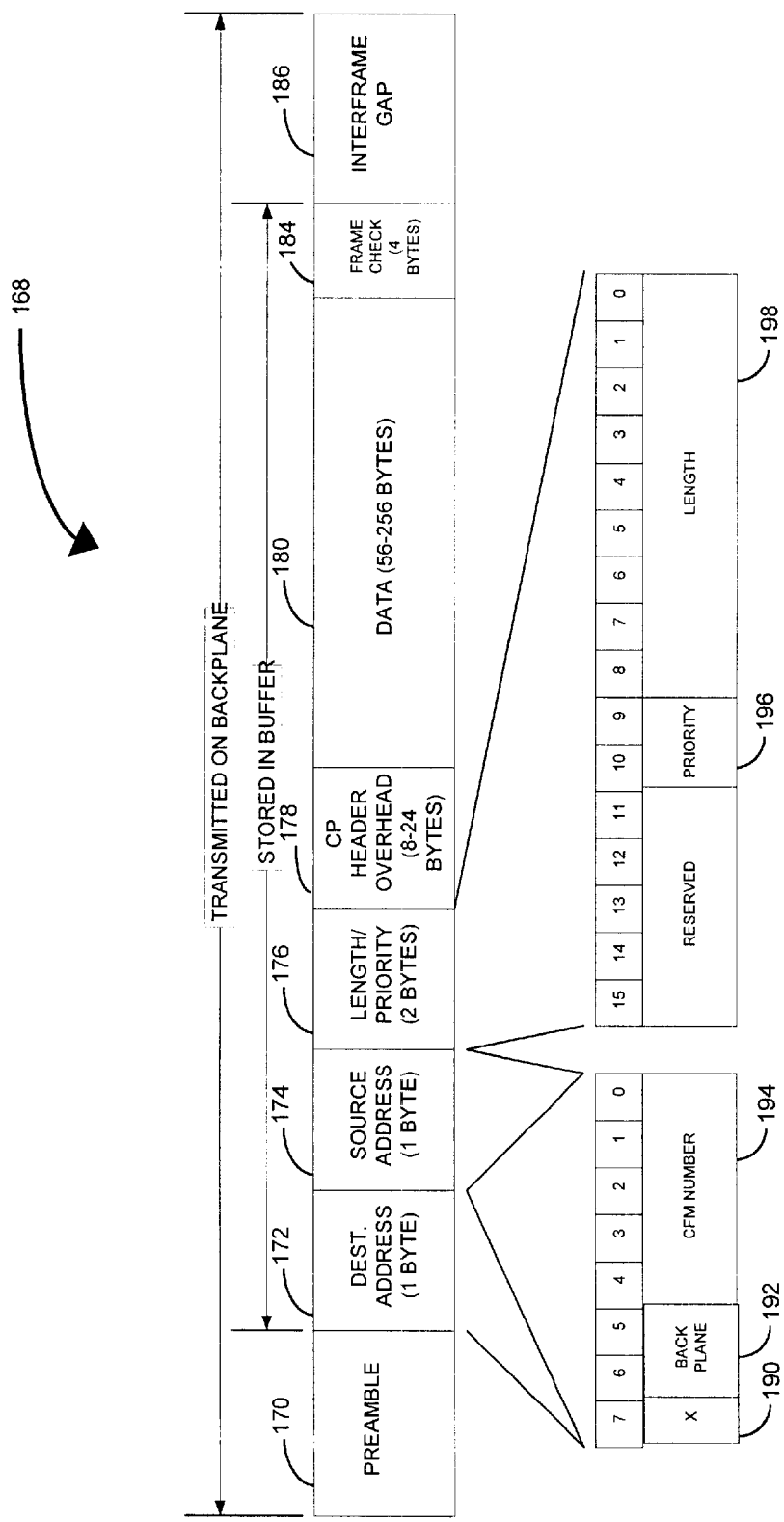
FIG. 7 is a block diagram of an embodiment of a switch packet format.

Referring to FIG. 7, an embodiment of a switch data packet 168 constructed for transmission of data from one function module to another function module (connected to the same or a different backplane within a network node 2) includes a preamble 170, which is used to indicate to the receiver that a message is about to begin. In one embodiment, the preamble is 8 bytes for packets communicated over 100 Mbit/sec. links. In another embodiment, the preamble is 1 byte for packets communicated over 200 Mbit/sec. links. A destination address 172 and a source address 174 are each one byte in length. The destination address 172 and source address 174 each include a two-bit backplane identifier 192, and a five-bit CFM identifier 194. In one embodiment, the mapping of the bits in the backplane identifier 192 to the backplane is as shown in Table 1.

TABLE 1

| Value | Backplane |
| --- | --- |
| 00 | Local Backplane |
| 01 | Backplane 1 |
| 10 | Backplane 2 |
| 11 | Back lane 3 |

Thus, this mapping provides for four backplanes within a node 2. An additional reserved bit 190 can be used for expanded capacity, and in other embodiments, additional bits or bytes in the packet may be used to incorporate more backplanes.

In one embodiment, the mapping of the bits in the function module identifier 194 is used to identify the function module or other port on the backplane switch, as shown in Table 2.

TABLE 2

| Value | Link |
| --- | --- |
| 0 0000 | Management |
| 0 0001 | CFM 1 |
| 0 0010 | CFM 2 |
| 0 0011 | CFM 3 |
| 0 0100 | CFM 4 |
| 0 0101 | CFM 5 |
| 0 0110 | CFM 6 |
| 0 0111 | CFM 7 |
| 0 1000 | CFM 8 |
| 0 1001 | CFM 9 |
| 0 1010 | CFM 10 |
| 0 1011 | CFM 11 |
| 0 1100 | CFM 12 |
| 0 1101 | CFM 13 |
| 0 1110 | CFM 14 |
| 0 1111 | CFM 15 |
| 1 0000 | CFM 16 |
| 1 0001–1 1111 | Unused |

The unused bit mappings may be used for expanding capacity; and in other embodiments, additional bits or bytes in the packet are used to incorporate more function modules/ports.

In one embodiment, a two-byte length/priority field 176 includes nine bits of data length information 198, which describes the number of bytes of data included in a packet. Two bits are used as a priority identifier. In one embodiment, there are three priorities of packets: voice and other data that must be communicated in real-time; high-priority data, which lower priority than the voice (real-time) data, but higher priority than low-priority data, and low priority data. In another embodiment, there is also a fourth priority: management and configuration information. The management information has the highest priority, since it is required to operate the network node. In one embodiment, there are two bits of priority information that are mapped as shown in Table 3.

TABLE 3

| Value | Priority |
| --- | --- |
| 00 | Management Configuration |
| 01 | Low Priority Data |
| 10 | High Priority Data |
| 11 | Voice/Real-Time |

Switching overhead information 178 includes eight to twenty-four bytes of information that can be used for storing information useful for other, higher communication layers. In one embodiment, the connection protocol header information is included in the switching overhead information 178. In another embodiment, the switching overhead information 178 includes Multiprotocol Layer Switching (MPLS) tags. In one embodiment, fifty-six to two hundred fifty-six bytes of data 180 are contained in the packet. If the combined length of the switching overhead information 178 and data 180 is less than sixty-four bytes, the data field 180 is padded for a combined length of sixty-four bytes. In another embodiment, a smaller minimum packet size is used. The packet includes four bytes of frame check data 184. In one embodiment, a CRC-32 checksum is used to calculate the frame check data, calculated in a manner similar to the IEEE 802.3 specification. Each packet is followed by inter-frame gap data 186. In one embodiment, the interframe gap data 186 is used to control (i.e. reduce) the amount of actual data communicated through a communications channel, by adding a small amount to the size of each packet. The interframe gap data 186 insures that more data will not be transmitted than can be stored in the memory. In an embodiment with faster memory, or a slower communications link, such interframe gap data 186 may not be needed. In one embodiment, the interframe gap data 186 is thirteen bytes for 100 Mbit/sec. communications. In another embodiment, the interframe gap data 186 various between zero and thirteen bytes for 200 Mbit/sec. communications.

Figure 8:
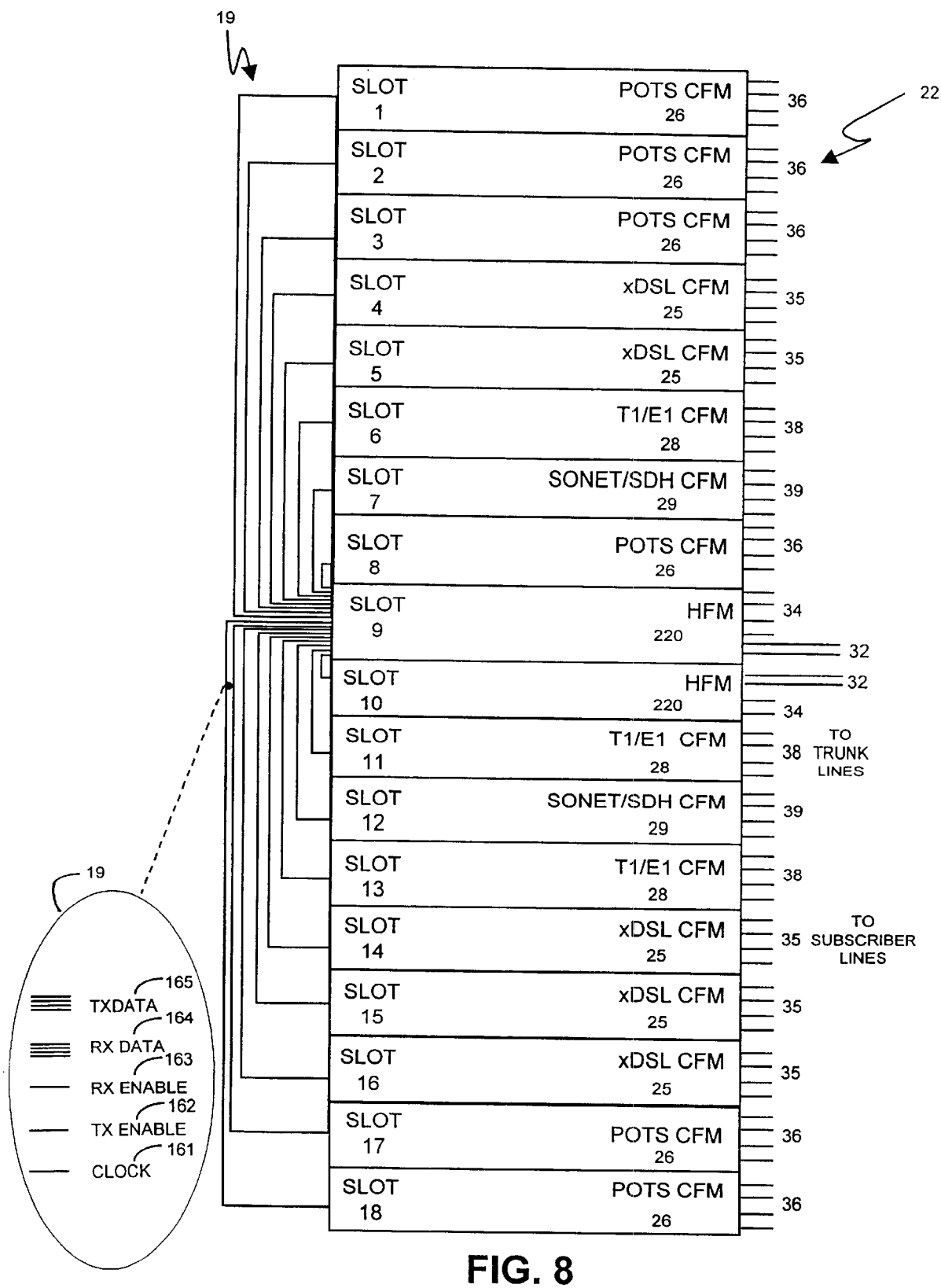
FIG. 8 is a block diagram of a backplane in an embodiment of a network node.

Referring to FIG. 8, in one embodiment, a backplane 22 of a the network node 2 includes two hub function modules ("HFMs") 220 and sixteen other function modules, also referred to as communication function modules ("CFMs"). In the embodiment shown in the figure, two HFMs are provided for redundancy, but one or more than two HFMs 220 might be appropriate in another embodiment. The number of function modules on the backplane in the described embodiment was a design choice made for enclosure spacing and other such reasons, and is not a limitation of the invention.

Function modules are implemented as circuit boards that are inserted into an eighteen slot backplane. The backplane provides −48V power to each of the function modules, as well as clock and other signals shared by the function modules. The function modules each have a DC/DC converter to convert the −48V power to the required operating voltages. In one embodiment, each function module can be inserted and removed from the backplane without disturbing the other function modules.

As shown in FIG. 8, the eighteen slots on a backplane 22 are labeled SLOT 1 through SLOT 18. In one embodiment, the backplane 22 provides a connection, generally 19, from SLOT 9 to each of the other 17 slots. The backplane 22 also provides a connection (not shown) from SLOT 10 to each of the other 17 slots. The connections allow each function module to communicate with the function modules in SLOT 9 and SLOT 10. In one embodiment, slots 9 and 10 are reserved for HFMs 220. In one embodiment, HFMs 220 include a backplane switch 30 to switch data packets from one function module to another. The backplane switch 30 communicates with the other function modules 25–29 using the connections 19 between SLOT 9 and the other seventeen slots, or the connections between SLOT 10 and the other seventeen slots. The two HFMs 220 in SLOT 9 and SLOT 10 provide redundancy in case of failure, and the ability to carry greater bandwidth if there is no failure. The HFMs 220 also have connections 32 to other backplanes. In one embodiment, the HFMs 220 also include network node 2 management functionality. In one embodiment, HFMs 220 provide an interface to other network nodes 2, and in one embodiment, HFMs 220 also provide an interface to subscriber or trunk circuits.

In another embodiment, the backplane switch 30 is incorporated into the backplane 22. In such an embodiment, the connections 19 to the function modules connect to the switch, and not to the HFM 220. This design choice makes the backplane more expensive, and may make the backplane switch 30 more difficult to maintain and repair.

In one embodiment, function modules 25–29 are located in any or all of the slots besides SLOT 9 and SLOT 10. The function modules provide ports 34–39, which interface to the various subscriber and trunk circuits connected to the network node 2. In one embodiment, the network node 2 includes POTS 26, xDSL 25, T1/E1 28, E3/T3 (not shown), SONET/SDH 29 and ethernet function modules (not shown). In another embodiment, ethernet interface functionality is included in the HFM 220, which has port connections 34. In FIG. 8, as an illustrative example, various types of function modules are shown located in the various slots. Other than the HFM 220 locations in SLOT 9 and SLOT 10, the slots in which the function modules are placed is intended to be illustrative, and is not meant to restrict the invention to any particular configuration. In the example shown in the figure, POTS function modules 26 are located in SLOT 1, SLOT 2, SLOT 3, SLOT 8, SLOT 17 and SLOT 18. xDSL function modules 25 are located in SLOT 4, SLOT 5, SLT 14, SLOT 15, and SLOT 16. T1/E1 function modules 28 are located slots SLOT 6, SLOT 11, and SLOT 13. SONET/SDH function modules 29 are located in SLOT 7 and SLOT 12. The function modules have ports 34–39 that connect to subscriber and/or trunk lines.

In one embodiment, the connections 19 between each of the function modules and the HFMs include eleven signal lines. These include a clock signal line 161 (generated by the HFM), an enable signal line 162 that is active during message transfer from the HFM (transmit enable), an enable signal line 163 that is active during message transfer to the HFM (receive enable), four receive data signal lines 164, and four transmit data signal lines 165. Each of the four receive 164 and transmit 165 data signal lines transfer data at one quarter of the total data rate. In one embodiment, the data connections are 100 or 200 Mbps connections implemented as four-bit-wide busses running at 25 MHz or 50 MHz over the four receive 164 and transmit 165 data signal lines. Connections to other backplane switches use eight data lines instead of four, and so they are 400 Mbps connections running at 50 MHz. Optional, higher-bandwidth connections accommodate higher bandwidth trunks either by increasing the transfer rate or the number of data lines. In one embodiment, the backplane switch also has connections to management functionality located on the same hub card.

Figure 9:
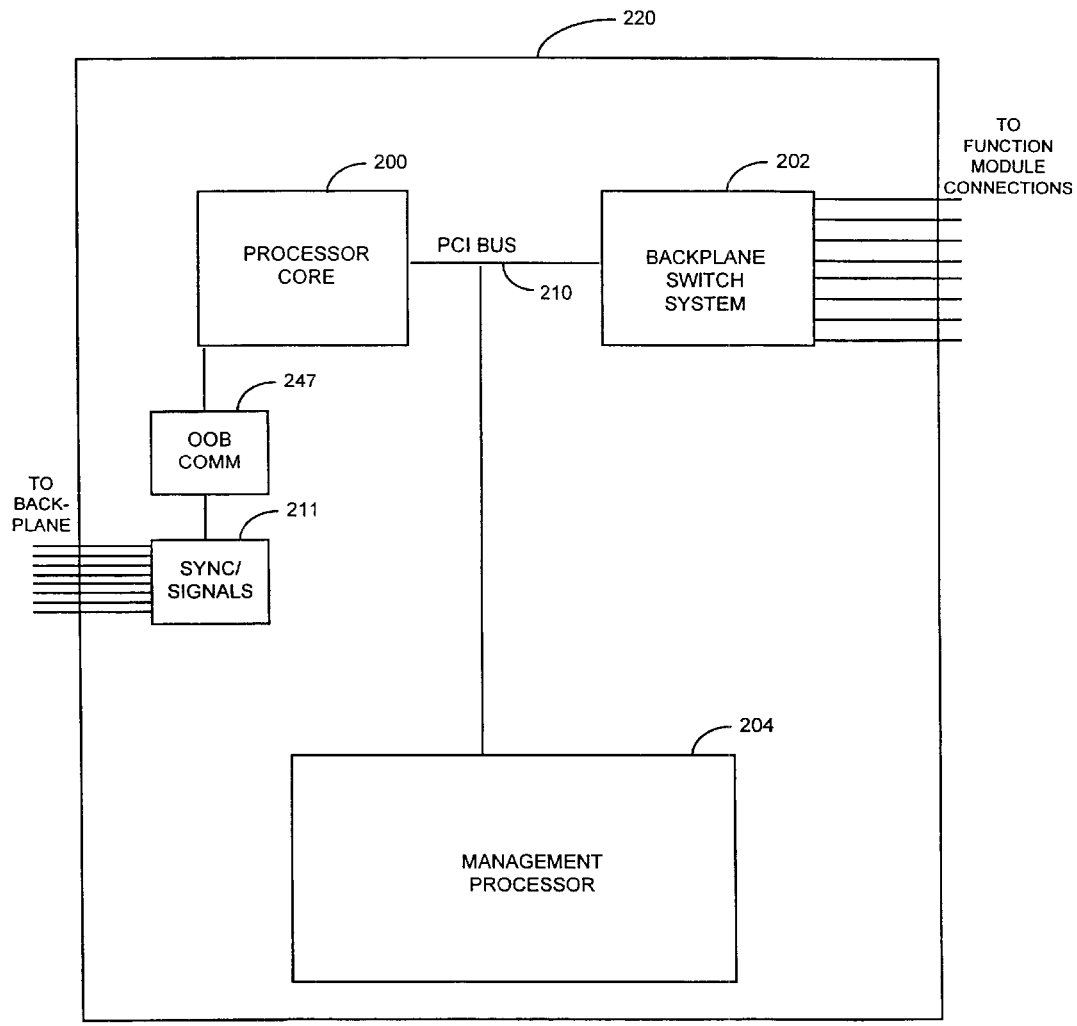
FIG. 9 is a block diagram of an embodiment of a hub function module.

Referring to FIG. 9, an embodiment of an HFM 220 includes a processor core 200. The processor core 200 directs the operation of the hub card 220. The processor core 200 is in communication with a backplane switching system 202 via a PCI bus 210. The backplane switching system 202 includes the backplane switch, and communicates data packets between the function modules. The HFM 220 also includes an out-of-band ("OOB") communications subsystem 247, which is used as an alternate communication channel between the HFM 220 and the other function modules in the network node. The OOB communications subsystem 247 may be used to direct the operation of the function modules, and is useful for instructing the function modules to take action in the event of backplane switch system faults.

The HFM 220 also includes a synchronization and signaling subsystem 211. This subsystem receives clock signal inputs that are used to synchronize the network node 2. This subsystem also receives and transmits signals provided to and received from external sources, such as ringer status and control lines, power status lines, function module status lines, and alarm relay control lines.

In one embodiment, one or more HFMs 220 in a network node 2 also include a management processor 204 that communicates with the processor core 200 and the backplane switching system 202. The management processor 204 directs the operation of the network node 2. The management processor is used for system configuration and monitoring. In one embodiment with more than one management processor 204 (i.e. if two or more HFMs 220 each have a management processor) the multiple processors cooperate to manage the network node. In another such embodiment, one management processor 204 is the selected default, and other management processor(s) on other HFM(s) 220 are used as a backup in case of failure. In yet another embodiment, the management processor 204 is implemented as a separate (free-standing) management processing computer that interfaces to the HFM 220 via an ethernet or other data communication interface.

Figure 10:
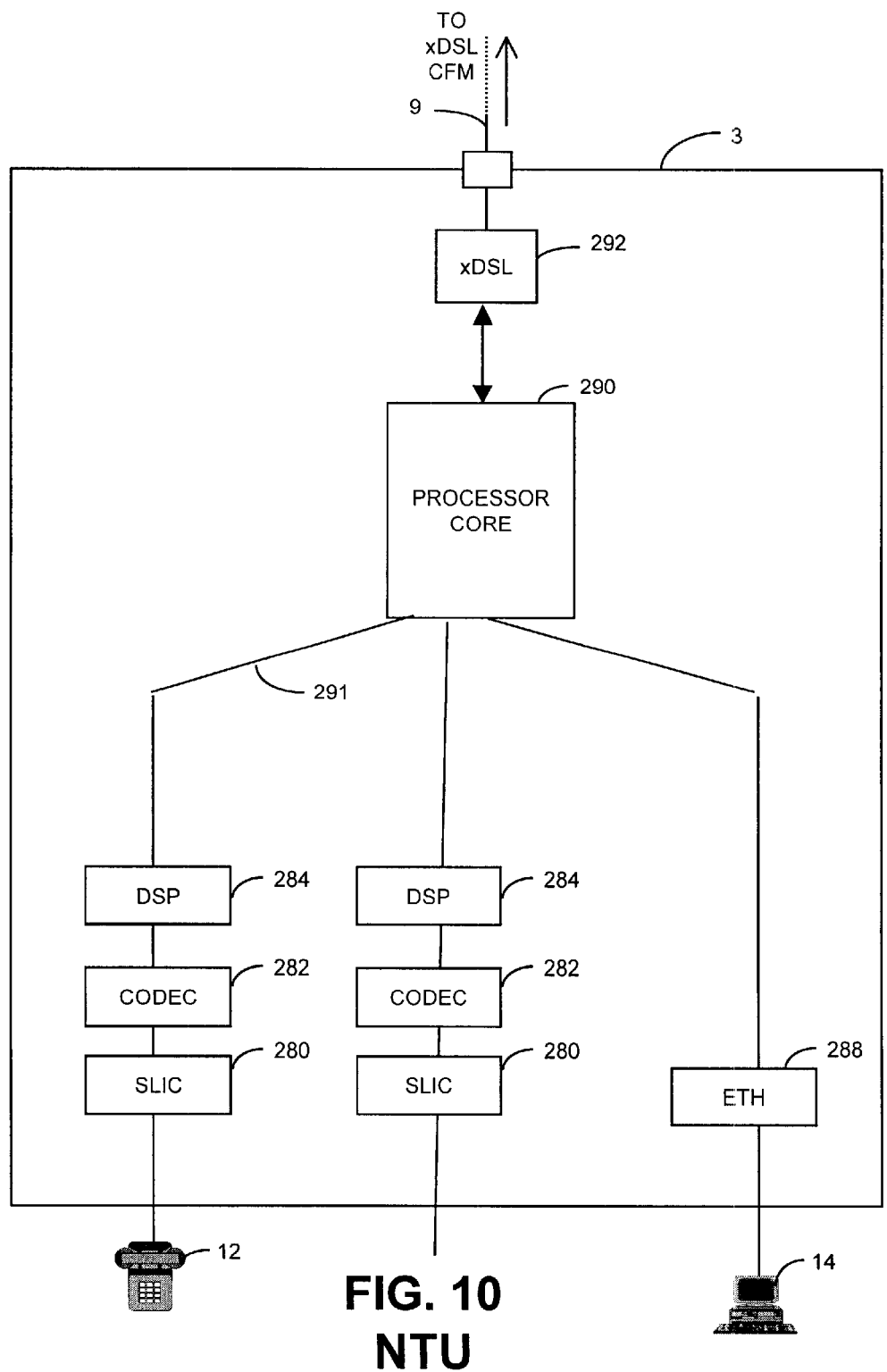
FIG. 10 is a block diagram of an embodiment of a network terminal unit.

Referring to FIG. 10, a network terminal unit NTU 3 provides an interface between the network node 2 domain and subscriber telephone signals and data signals. In one embodiment, the NTU 3 provides a POTS telephone interface and an ethernet data interface. In one embodiment, the NTU includes some of the capabilities of voice telephone interface of the POTS function module and some of the capabilities of an ethernet function module. In one embodiment, the NTU 3 transmits both voice and data signals over a subscriber link by communicating connection protocol packets over xDSL.

The NTU 3 transforms telephone signals into connection protocol packets. The NTU 3 receives telephone signals from the subscriber loop interface circuit (SLIC) 280. The SLIC 280 interfaces a CODEC 282 to the subscriber loop. The SLIC 280 provides battery voltage and supervisory current to the tip/ring pair, detects loop start and ground start seizures, provides and regulates loop current, reverses battery signaling, provides ringing injection to alert a subscriber, and stops ringing when a subscriber answers a call. In one embodiment, the HC55182 integrated circuit from Harris is used to implement the SLIC 280.

The SLIC 280 is connected to an analog-to-digital and digital-to-analog coder/decoder 282, also referred to as a CODEC. In one embodiment, each CODEC integrated circuit interfaces with up to four SLICs 280. The example NTU 3 shown in the figure has two SLICs, but this is not intended to limit the invention to any particular number of SLICs 280. In one embodiment, each CODEC integrated circuit is implemented as a Siemens PEB2466, which has hybrid balance and filtering functionality. The CODEC 282 converts voiceband analog signals and provides a 128 kb/second serial signal to a digital signal processor (DSP) 284. In one embodiment, the CODEC 282 communicates with a DSP 284 over a time-division multiplexed (TDM) communications link.

The DSP 284 processes signal data, including compression, insertion of comfort noise, and so on, and communicates with the processor core 290. In one embodiment, the DSP 284 is implemented as a TMS320VC5410 digital signal processor, available from Texas Instruments. The DSP 284 communicates with the processor core 290 via a HDLC serial communications interface in the processor core 290. The processor core also has access to the DSP 284 via a port mapped into the CPU memory space, and implemented in the programmable logic in the processor core. The port access is used to load software into the DSP 284 at power-up, and occasionally during operation. It is also useful for accessing DSP 284 memory for system debug and maintenance.

In the other direction, data provided by the processor core 290 is transmitted to the DSP 284 for processing. The DSP 284 exchanges data with the CODEC 282. The CODEC 282 converts the data into analog telephone signals, which are passed through the SLIC 280 for level equalization and so on. Thus, these devices compose the POTS protocol interface.

Telephone signaling data will also be sent to the NTU 3, for example to initiate customer alert (ringing), receive on/off hook signals, dialing and so on. Such signaling data will be processed by a call control function which is included in software running on the processor core 290.

For ethernet data, the hardware interface is provided by an ethernet interface 288 that is connected to a serial communications controller port in the processor core 290. The processor core 290 receives ethernet packets from the ethernet interface, and converts them into the connection protocol format. This conversion takes place in the processor core 290, in other words the ethernet protocol interface is implemented using the ethernet MAC 288 and software running on the processor core.

In one embodiment, the processor core is a stand-alone processor that includes memory, a bus interface, serial communications, and so on. In another embodiment, the processor core includes a CPU, such as a PENTIUM processor from INTEL CORPORATION or a POWER PC from MOTOROLA, INC of Austin, Tex. The processor core includes one or more bus interfaces (e.g. PCI), memory (e.g. RAM and ROM) and so on. The software running on the processor core 290 includes the interworking function and the connection protocol software switch. The data output from the connection protocol software switch is provided to the xDSL interface 292. Similarly, data packets received by the xDSL interface 292 are passed on to the processor core 290 for processing by the connection protocol software switch, the interworking function, and then, after the data is passed to the appropriate protocol interface, by either the POTS protocol interface 280, 282, 284 or the ethernet protocol interface 288.

Figure 11:
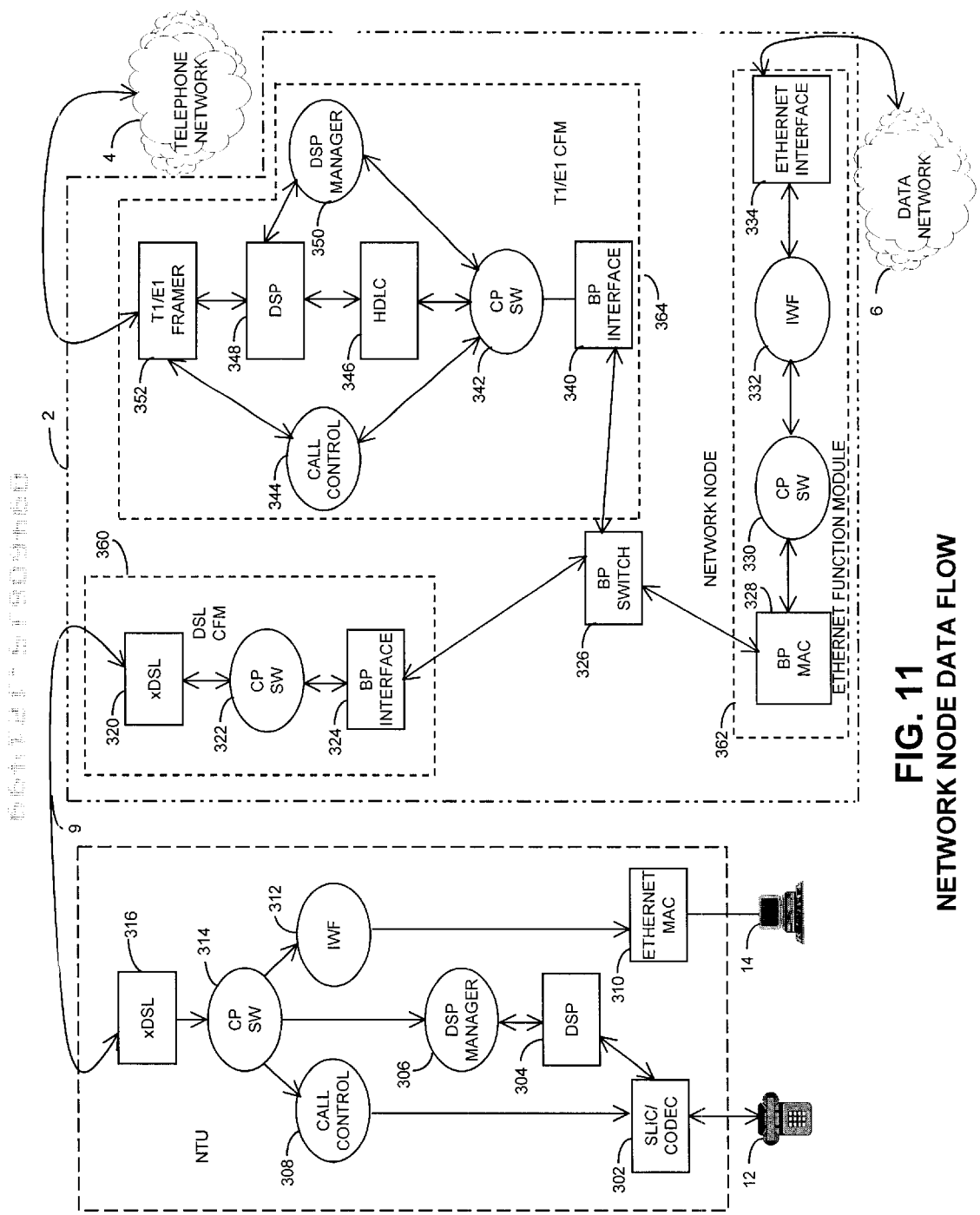
FIG. 11 is a block diagram of an embodiment of a system including a network node and a network terminal unit.

Referring to FIG. 11, the NTU 3 interfaces with subscriber POTS telephone equipment 12 and subscriber ethernet data equipment 14. The subscriber telephone equipment 12 is connected, via the NTU 3 and network node 2 to the telephone network 4. The subscriber data equipment, which can be, in various embodiments, a computer, a computer network, a digital video communications system, and so on, is connected to data network 6 via the NTU 3 and network node 2.

The subscriber telephone equipment 12 interfaces with a SLIC and CODEC 302, which gets signaling instructions from and provides signaling to a call control module 308. The call control module 308 receives and transmits packets containing signaling data to the connection protocol switch 314. The digitized voice telephone signals are provided to a DSP 304 which interfaces with DSP manager software 306. The DSP manager software includes interworking functionality, and provides data packets to and receives data packets from the connection protocol software switch 314.

The subscriber data equipment 14 exchanges data with the ethernet interface 310, which provides data in the form of packets to the interworking function 312. The interworking function 312 exchanges data with the connection protocol switch 314. In one embodiment, the interworking function 312 and connection protocol switch 314 are implemented as software modules running on the NTU processor core 290 (FIG. 10). The connection protocol switch 314 on the NTU 3 does not convert the packets into switch packets, rather, it exchanges packets with the network node 2 in connection protocol format. The connection protocol switch 314 exchanges the voice, telephone signaling, and ethernet data with the NTU's 3 xDSL interface 316. The voice, telephone signaling and ethernet data all come to the connection protocol switch 314 in connection protocol format.

The network node 2 interface to the NTU 3 is a xDSL function module 360. The xDSL function module 360 includes an xDSL interface 320, which receives packets from (and transmits packets to, the NTU 3 via the NTU's 3 xDSL interface 316. The packets are exchanged in connection protocol format. The xDSL function module interworking function determines that the packets are connection protocol packets (or is configured such that) the connection protocol packets from the NTU 3 are passed on to the connection protocol switch 322 on the xDSL function module. Based on the connection indicated by the connection protocol header, the connection protocol switch 322 determines the destination for the packet. The connection protocol switch encapsulates the connection protocol packet into a switch packet, with the appropriate source and destination information, and so on. The connection protocol switch 322 then provides the packets via a backplane interface 324 to the backplane switch 326. The backplane switch 326 determines the destination for the packets, based on the switch header, and passes the packets on to their destination, which can be another function module within the network node (as shown in the figure) or another backplane, or another network node.

The data packets from the subscriber computer equipment 14, in this example, are transferred to an ethernet function module 362 via the backplane switch 326. Packets with a switch packet identifier of the ethernet function module are received by the backplane switch interface 328. The packets are passed on to the connection protocol switch 330 and the interworking function 332. The connection protocol switch software 330, after checking the integrity of the switch packet, and removing the switch packet header, examines the connection identifier on the connection protocol packet and determines that the packet is destined for the ethernet interface 334. The connection protocol switch software passes the packet on to the interworking function 332. The interworking function 332 recombines the packets with others (if necessary) to form an ethernet frame, and transmits the ethernet frame out of the ethernet interface 334.

The voice telephone connection protocol packets, which in this example, include both signaling information and voice signals, are forwarded to the T1/E1 function module 364. The connection protocol switch 342 on the T1/E1 function module 364 verifies the integrity of the switch packet and extracts the connection packet from the switch packet. The connection protocol switch 342 determines, based on the connection packet header, whether a packet is a signaling packet, a voice data packet, or a computer data packet. If the packet is from a telephone signaling connection, the packet is forwarded to the call control module 344. The call control module 344 may convert the signaling into the appropriate signaling data to transmit over the T1/E1 link, or the call control module may simply pass the packet on to the T1/E1 framer. If the packet is voice data, it is forwarded to the appropriate DSP 348 for the port/channel on the T1/E1 function module 364 via the HDLC interface 346. The DSP 348 processes the voice signals, by uncompressing, adding/removing comfort noise, and so on. The DSP 348 then passes the packet on to the T1/E1 framer 352.

In one embodiment, the T1/E1 function module 364 includes a computer processor running software. The backplane interface 340 receives the switch packets from the backplane, and passes them on to the processor. Software running on the processor includes the connection protocol switch 342, the call control module 344 and the DSP manager 350. The headers of the connection packets are read by the connection protocol switch 342, and passed on to call control module 344, the DSP manager 350, or to the appropriate DSP 348 for the port/channel indicated by the connection identifier for processing. The DSP 348 software includes interworking functionality 332 in that it processes the data and arranges packets for output over the T1/E1 framers. The T1/E1 framers are the final part of the protocol interface in that they transmits the packets on the T1/E1 lines.

In the other direction, signals from the T1/E1 trunks will enter the network node 2 through a port associated with a T1/E1 framer 352 on the T1/E1 function module 364. The T1/E1 framer 352 identifies the incoming packets. T1/E1 call control information is passed to the call control module 344. T1/E1 call data is directed to the DSP 348 for compression and processing. The packets are output from the DSP to the connection protocol switch 342 via the HDLC controller 364. The connection protocol switch determines from the packet's port/channel source the appropriate connection identifier, for example a signaling connection to the NTU call control module 308, or a voice conversation connection, etc. The connection protocol switch appends the appropriate connection protocol header on the packets, and encapsulates the connection protocol packet in a switch packet. The switch packet has a destination of the XDSL function module 360. The backplane switch 326 receives the packet from the T1/E1 function module 364, and forwards the packet to the xDSL function module 360.

Similarly, data packets from the data network 6 enter the network node 2 via an ethernet interface 364. The interworking function 332 first identifies the incoming packets. The interworking function 332 may break up large ethernet packets into numbered frames. The interworking function 332 appends a connection header to the packet.

In one embodiment, the interworking function uses the ethernet port that is the packet's source to determine where to forward the packet, and all packets from that source ethernet port are forwarded from that ethernet port to a destination. Alternatively, the connection protocol software switch may look at the ethernet MAC address that is the destination for the packet, and determine the destination (and the appropriate connection identifier) from the ethernet MAC address.

Other, more complicated embodiments use other data in the incoming data packet to determine the connection header. For example, other embodiments can include using a multiprotocol label switching ("MPLS") label, an IP address, an ATM header, or some combination thereof to determine the connection identifier. It can be just as useful (and more efficient in some circumstances), to locate a separate MPLS label-switch router, IP router, or an ATM switch at the edge of the data network 6 to interface with the network node 2.

In one embodiment, the connection header is determined based on the ethernet (MAC) address that is the packet's destination. The interworking function identifies from the destination ethernet address that the NTU 3, and in particular the ethernet interface 310 on the NTU 3, is the desired destination. Once the destination determined, and the connection identifier completed, the connection protocol software switch encapsulates the connection protocol packet in a switch packet. In this case, the switch header will indicate that the xDSL function module 360 is the packet's destination. The switch packet is queued for communication by the backplane switch 326, and transferred to the xDSL function module 360.

The xDSL function module 360 thus receives connection protocol packets from the T1/E1 CFM 364 and the ethernet function module 362. The packets are received by the backplane switch interface 324 and passed on the connection protocol switch 322. The connection protocol switch recognizes that the end of the connection specified in the connection header is on NTU 3, and so the packets are forwarded, via xDSL interface 320 over xDSL link 9, to the NTU 3.

On the NTU 3, the connection protocol packets are first received by the xDSL interface 316. The received connection protocol packets are passed on to the connection protocol switch 314, which determines the appropriate destination for the packets based on the connection headers. Call control packets have a connection header that indicates that the call control module 308 is the packet destination. Voice data packets are passed onto the DSP 304, and then the CODEC/SLIC for output as telephone signals. The DSP will process the packets and provide the appropriate output to the CODEC/SLIC 302. Computer data packets from the ethernet function module 362 are passed on to the interworking function 312, which reconstructs the packets as necessary, and forwards the reconstructed packets to the ethernet interface 310.

Thus, the system allows for voice (including telephone voice and signaling) and data signals to be communicated over the xDSL link 9, using the same connection protocol. Voice and data signals are thus communicated over the same protocol link layer. In another embodiment, a connection can be provisioned between the telephone port on the NTU and the ethernet function module 362. For example, in one such embodiment, the interworking function 332 on the ethernet function module 362 transforms voice over internet protocol (VOIP) packets into the appropriate connection protocol packets for transmission to the telephone set 12. The DSP 304 and call control 308 covert telephone signals into VOIP packets, and send them to the ethernet function module 362. The communication links still use the same connection protocol and the same backplane switch 326. Similarly, in another embodiment, using the connection protocol described herein, data from the subscriber computer network 14 can be exchanged with a T1/E1 link. Such an embodiment could require the addition of an interworking function to the T1/E1 framer for arranging the data packets appropriately. Again, such a system would use the same connection protocol.

The flow of packets through the node as just described takes place though the operation of the backplane switch 326. The backplane switch receives packets from function modules, other backplane switches, and the management processor, and possibly directly from other network nodes, and directs the packets to other function modules.

Figure 12:
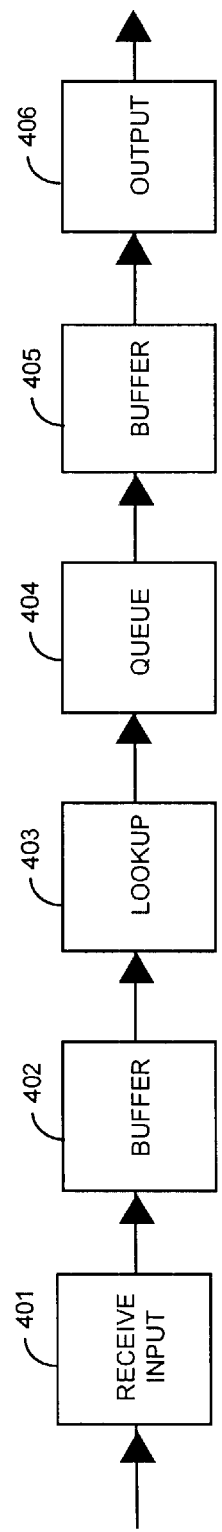
FIG. 12 is a flowchart showing packet flow through an embodiment of a backplane switch.

Referring to FIG. 12, the flow of a switch packet, such as the packet of FIG. 7, through the backplane switch 326 begins with receipt 401 of a packet from an input (from the point of view of the backplane switch) function module 30 and ends with the transmission 406 of the packet to an output function module. The packet input 401 and output 406 may be from or to the same or different function modules, and the packet input 401 and output 406 also can be to and from other backplane switches, or to/from the management functionality on the HFM. From the point of view of the backplane switch, each function module, other backplane switch, etc. is connected to a switch port on the switch, which is how that function module, other backplane switch, etc, can send and receive switch packets to the backplane switch. For simplicity, communication will be described to and from function modules, with the understanding that in this context such communication also includes communication to and from other backplane switches on other backplanes, the management processor, and so on. When the HFM includes ethernet function module functionality, as described above, even the HFM itself is considered another port on the switch. The communications links, as mentioned above, receive and transmit packets at a sufficient bandwidth to accommodate the packet flow.

An inbound packet from a function module is received 401 by a switch interface and placed in a rate-matching FIFO buffer 402. The FIFO buffer is used to temporarily store the data. Each received packet contains information that was put in the packet by the packet source, i.e. the function module, backplane switch, or manager, that specifies the destination for that packet. The switch packet format of FIG. 7 includes the one byte destination address 172. A look-up is performed on the packet by a lookup unit 403 to determine on which outbound port the packet is to be transmitted. The packet also contains information that specifies the priority of the packet. The switch packet format of FIG. 7 includes priority bits 196. In one embodiment, there are three outbound queues associated with each port: a voice queue, a high-priority data queue, and a low-priority data queue. In another embodiment, there is an additional queue for management and configuration information. The switch packet is placed on the appropriate priority queue for the appropriate port. The packet is read from the queue into an outbound rate-matching FIFO buffer 405, and output 406 to the destination function module. In one embodiment, the input 401, FIFO 402, lookup 403, and queuing 404 steps are performed by an input port interface, and the queue reading and output FIFO buffering step 405 and output step 406 are performed by an output port interface.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for providing voice and data service, comprising the steps of:

(a) receiving telephone signals;

(b) receiving data signals;

(c) transmitting connection protocol packets in a single protocol link layer over a subscriber line in response to the received telephone signals and the received data signals, the packets each associated with one of a plurality of connection-protocol connections, wherein each packet comprises a header comprising a connection identifier that identifies the connection-protocol connection with which a packet is associated, and each packet is one of a signaling packet, a voice packet, and a computer data packet;

(d) receiving the connection protocol packets in a single protocol link layer over the subscriber line;

(e) transmitting data signals in response to the packets received from the subscriber line having a connection identifier associated with a first connection-protocol connection; and (f) transmitting telephone signals in response to the packets received from the subscriber line having a connection identifier associated with a second connection-protocol connection.

2. The method of claim 1 wherein steps (a)–(f) are performed simultaneously.

3. The method of claim 1 wherein:

step (c) comprises transmitting connection protocol packets in a single protocol link layer over a subscriber loop in response to the received telephone signals and the received data signals; and step (d) comprises receiving connection protocol packets in a single protocol link layer over the subscriber loop.

4. The method of claim 3 wherein:

step (c) comprises transmitting connection protocol packets in a single protocol link layer over a subscriber loop using xDSL protocol in response to the received telephone signals and the received data signals; and step (d) comprises receiving connection protocol packets in a single protocol link layer over the subscriber loop using xDSL protocol.

5. The method of claim 4 wherein:

step (c) comprises transmitting connection protocol packets in a single protocol link layer over a subscriber loop using xDSL protocol to a network node in response to the received telephone signals and the received data signals; and step (d) comprises receiving connection protocol packets in a single protocol link layer over the subscriber loop using xDSL protocol from a network node.

6. The method of claim 1, wherein:

step (a) comprises receiving telephone signals via a telephone connection;

step (b) comprises receiving data signals via a data connection;

step (e) further comprises transmitting data signals via the data connection; and step (f) further comprises transmitting telephone signals via the telephone connection.

7. The method of claim 1, wherein:

step (a) comprises receiving telephone signals from a telephone trunk;

step (b) comprises receiving data signals from a data network;

step (e) further comprises transmitting data signals to the data network; and step (f) further comprises transmitting telephone signals to the telephone trunk.

8. A method for providing voice and data service, comprising the steps of simultaneously:

(a) communicating telephone signals with a first network node;

(b) communicating data signals with the first network node; and (c) communicating connection protocol packets in a single protocol link layer between the first network node and a second network node over a subscriber line in response to the telephone signals and the data signals, the packets each associated with one of a plurality of connection-protocol connections, wherein each packet is one of a signaling packet, a voice packet, and a computer data packet and wherein each packet comprises a label indicative of a connection according to the connection protocol, the telephone signals and data signals being communicated using different connection protocol connections.

9. The method of claim 8 wherein step (a) comprises communicating between a telephone network and the first network node and step (b) comprises communicating between a data network and the first network node.

10. A subscriber line connected to a network node and a subscriber device, the subscriber line comprising a xDSL signal, the xDSL signal comprising connection protocol packets, the connection protocol packets comprising telephone signals and data signals, each packet associated with one of a plurality of connection-protocol connections, wherein said telephone signals and data signals are communicated on the same protocol link layer over the subscriber line using different connection protocol connections.

11. A network terminal unit, comprising:

a telephone interface in communication with a telephone connection;

a data interface in communication with a data connection; and a transceiver in communication with the telephone interface, the data interface, and a subscriber line connection, the transceiver communicating packets in a single protocol link layer over the subscriber line connection in response to telephone signals received by the telephone interface and data signals received by the data interface, the packets each being associated with one of a plurality of connection-protocol connections and each comprising a connection identifier that identifies the connection-protocol connection with which a packet is associated, and wherein the packets communicated in response to telephone signals are associated with a first connection-protocol connection and the packets communicated in response to data signals are associated with a second connection-protocol connection.

12. The network terminal unit of claim 11, wherein the data interface comprises an ethernet protocol interface.

13. The network terminal unit of claim 11, wherein the telephone interface comprises a POTS interface.

14. The network terminal unit of claim 11 wherein the transceiver comprises:

an interworking function for receiving packets from the telephone interface and the data interface and converting the packets into connection protocol packets;

a connection protocol switch for identifying the destination of the connection protocol packets; and a switch interface for transmitting the connection protocol packets over the subscriber line connection.

15. The network terminal unit of claim 14, wherein the transceiver receives connection protocol packets in a single protocol link layer from the subscriber loop connection, and communicates voice telephone signals to the telephone interface and data signals to the data interface in response to the connection protocol packets.

16. The network terminal unit of claim 11, wherein the transceiver comprises:

a connection protocol switch for identifying the destination of the connection protocol packets; and an interworking function for converting the connection protocol packets into data appropriate for the voice interface and the data interface.

17. A network node comprising a first plurality of function modules, each of said first plurality of function modules comprising:

a protocol interface for receiving telephone signals and voice signals and converting the signals into intermediate packets, and for transmitting signals in response to intermediate packets;

an interworking function for receiving the intermediate packets from the protocol interface and converting the packets into connection protocol format, each packet comprising a header comprising a connection identifier that identifies one of a plurality of connection-protocol connections with which a packet is associated, and for converting connection protocol packets into intermediate packets and providing the intermediate packets to the protocol interface;

a connection protocol switch for identifying the destination of the connection protocol packets; and
a switch interface for communicating connection protocol packets with a backplane switch;
wherein the telephone signals and data signals are communicated using different connection protocol connections.

18. A system for providing voice and data service, comprising:
a network node comprising a function module, said function module comprising:
a protocol interface for receiving telephone signals and data signals and converting the signals into intermediate packets, and for transmitting signals in response to intermediate packets;
an interworking function for receiving the intermediate packets from the protocol interface and converting the packets into connection protocol formats each packet comprising a header comprising a connection identifier that identifies one of a plurality of connection-protocol connections with which a packet is associated, and for converting connection protocol packets into intermediate packets and providing the intermediate packets to the protocol interface;
a connection protocol switch for identifying the destination of the connection protocol packets; and
a switch interface for communicating connection protocol packets with a backplane switch;
a subscriber line in electrical communication with the protocol interface on the network node;
a network terminal unit, comprising:
a subscriber line interface in communication with the subscriber line for communicating connection protocol packets in a single protocol link layer over the subscriber line with the network node;
wherein the telephone signals and data signals are communicated using different connection protocol connections.

19. The method of claim 1, wherein the telephone signals comprise voice telephone signals.

20. The method of claim 1, wherein the telephone signals comprise telephone control signals.

21. The method of claim 1, wherein the header of each packet comprises a quality-of-service indicator.

22. The method of claim 21, wherein the quality-of-service indicator identifies a packet priority.

23. The method of claim 1, wherein:
step (c) comprises transmitting connection protocol packets in a single protocol link layer over a subscriber line to a backplane switch in response to the received telephone signals and the received data signals; and
step (d) comprises receiving connection protocol packets in a single protocol link layer over the subscriber line from a backplane switch.

24. The method of claim 1, wherein step (a) comprises:
(a-1) receiving telephone signals at an interface port and channel;
(a-2) parsing received telephone signals into packets;
(a-3) determining a connection identifier in response to the interface port and channel receiving the telephone signals; and
(a-4) including the connection identifier in the packets.

25. The method of claim 24, wherein step (a-3) comprises:
(a-3a) assigning to a packet an intermediate header indicating a source port and channel of the telephone signals;
(a-3b) reading the source port and channel information from the intermediate header;
(a-3c) determining a connection responsive to the read source port and channel information; and
(a-3d) assigning to each packet a connection protocol header.

26. The method of claim 1, wherein step (b) comprises, for at least one packet:
(b-1) receiving data signals at an interface port and channel;
(b-2) parsing received data signals into packets;
(b-3) determining a connection identifier in response to the interface port and channel receiving the data signals; and
(b-4) including the connection identifier into the at least one packet.

27. The method of claim 24, wherein step (a-3) comprises:
(a-3a) assigning to the at least one packet an intermediate header indicating a source port and channel of the data signals;
(a-3b) reading the source port and channel information from the intermediate header;
(a-3c) determining a connection responsive to the read source port and channel information; and
(a-3d) assigning to the at least one packet a connection protocol header.

28. The method of claim 8, wherein the telephone signals comprise voice telephone signals.

29. The method of claim 8, wherein the telephone signals comprise telephone control signals.

30. The method of claim 8, wherein each packet header further comprises a quality-of-service indicator.

31. The method of claim 8, wherein step (c) comprises:
(c-1) encapsulating the connection protocol packets in another communication protocol in response to the telephone signals and the data signals, wherein each packet carries only one of telephone signals and data;
(c-2) communicating the encapsulated connection protocol packets in a single protocol link layer between the first network node and a second network node in response to encapsulating the connection protocol packets.

32. The method of claim 31, wherein the another communications protocol comprises point-to-point protocol (PPP).

33. The method of claim 32, wherein the point-to-point protocol (PPP) comprises multilink point-to-point protocol (MLPPP).

34. The method of claim 10, wherein the telephone signals comprise voice telephone signals.

35. The method of claim 10, wherein the telephone signals comprise telephone control signals.

36. The network node of claim 17, further comprising:
a first backplane in electrical communication with the switch interface of each of the first plurality of function modules; and
a first backplane switch in electrical communication with the first backplane, wherein the first backplane switch exchanges packets between the first plurality of function modules.

37. The network node of claim 36, further comprising:
a second plurality of function modules, each function module having a switch interface;
a second backplane in electrical communication with the switch interface of each of the second plurality of function modules; and a second backplane switch in electrical communication with the second backplane and with the first backplane switch, wherein the second backplane switch exchanges packets between the first plurality of function modules and the second plurality of function modules.

38. The network node of claim 17, wherein the connection protocol switch comprises a memory element for queuing the connection protocol packets.

39. A system for providing voice and data service, comprising:

means for receiving telephone signals;

means for receiving data signals;

means for transmitting connection protocol packets in a single protocol link layer over a subscriber line in response to the received telephone signals and the received data signals, the packets each associated with one of a plurality of connection-protocol connections, wherein each packet comprises a header comprising a connection identifier that identifies the connection-protocol connection with which a packet is associated;

means for receiving the connection protocol packets in a single protocol link layer over the subscriber line;

means for transmitting data signals in response to the packets received from the subscriber line having a connection identifier associated with a first connection-protocol connection; and means for transmitting telephone signals in response to the packets received from the subscriber line having a connection identifier associated with a second connection-protocol connection.

40. The method of claim 39, wherein the telephone signals comprise voice telephone signals.

41. The method of claim 39, wherein the telephone signals comprise telephone control signals.

* * * * *